United States Patent
Miyashita et al.

[11] Patent Number: 6,124,909
[45] Date of Patent: Sep. 26, 2000

[54] COLOR LIQUID CRYSTAL DISPLAY DEVICE HAVING A PLURALITY OF PIXEL AREAS WHICH EMIT NON-COLORED LIGHT

[75] Inventors: Takashi Miyashita, Ome; Tetsushi Yoshida, Kanagawa-ken; Hidetoshi Akao, Akishima; Tsuyoshi Toyoshima, Hino; Jiro Takei, Hachioji, all of Japan

[73] Assignee: Casio Computer Co., Ltd., Tokyo, Japan

[21] Appl. No.: 08/994,835

[22] Filed: Dec. 19, 1997

[30] Foreign Application Priority Data

| Dec. 25, 1996 | [JP] | Japan | 8-345850 |
| Mar. 28, 1997 | [JP] | Japan | 9-077905 |
| Mar. 28, 1997 | [JP] | Japan | 9-077907 |
| May 16, 1997 | [JP] | Japan | 9-127227 |
| May 23, 1997 | [JP] | Japan | 9-133572 |
| Jun. 11, 1997 | [JP] | Japan | 9-153764 |

[51] Int. Cl.$^7$ ............................................. G02F 1/1335
[52] U.S. Cl. ............................................. 349/109; 349/113
[58] Field of Search ......................... 349/113, 106, 349/109

[56] References Cited

U.S. PATENT DOCUMENTS 5,122,891  6/1992  Kim .

FOREIGN PATENT DOCUMENTS

| 0 786 684 A1 | 7/1997 | European Pat. Off. . |
| 8-286178 | 1/1996 | Japan . |
| WO 97/04350 | 2/1997 | WIPO . |

*Primary Examiner*—Kenneth Parker
*Attorney, Agent, or Firm*—Frishauf, Holtz, Goodman, Langer & Chick, P.C.

[57] ABSTRACT

In a liquid crystal display device using color filters, the area of each of color filters arranged on the inner surface of one of substrates in correspondence with the pixel areas is set to be smaller than that of each pixel area to form non-colored light exit areas, and color pixels are displayed with non-colored light which is not transmitted through the color filters and colored light which is transmitted through the color filters. Since high-luminance color pixels are displayed with these colored light and non-colored light, the screen can be made brighter. The liquid crystal display device further includes a reflecting member for reflecting external light incident from the front side of the device and transmitted through the liquid crystal layer toward the front side. In addition, in the liquid crystal display device, reflecting films for reflecting light incident from the front side of the device toward the front side are arranged on the inner surface of the front-side substrate in correspondence with the areas between the respective pixel areas, thereby making the portions between the respective pixel areas bright and further increasing the overall brightness of the screen.

47 Claims, 21 Drawing Sheets

COLOR LIQUID CRYSTAL DISPLAY DEVICE HAVING A PLURALITY OF PIXEL AREAS WHICH EMIT NON-COLORED LIGHT

BACKGROUND OF THE INVENTION

The present invention relates to a liquid crystal display device having color filters.

As liquid crystal display devices, a transmission type display device that displays using light from a backlight and a reflection type display device that displays using external light such as natural light or indoor illumination light are known. In the reflection type liquid crystal display device, a reflecting member is placed on the rear side to reflect external light incident from the front side.

Liquid crystal display devices also include devices of various schemes such as active matrix display devices and simple matrix display devices. For example, in a liquid crystal display device of the active matrix scheme, a matrix of pixel electrodes and a plurality of active elements respectively connected to the pixel electrodes are formed on the inner surface of one of a pair of substrates opposing each other through a liquid crystal layer. A counter electrode is formed on the inner surface of the other substrate, and pixel areas are formed by the portions where the counter electrode opposes the respective pixel electrodes.

In a liquid crystal display device for displaying a color image, color filters are arranged on the inner surface of one of a pair of substrates in correspondence with the respective pixel areas.

In a conventional liquid crystal display device having color filters, however, when light transmitted through a given pixel area is incident on the corresponding color filter, light having wavelengths other than a specific wavelength range is absorbed by the color filter, and only the light in the specific wavelength range is transmitted, thereby displaying with the transmitted light colored with the color of the color filter. For this reason, the intensity of the colored exit light becomes much lower than that of the incident light, and a bright display cannot be obtained.

To increase the brightness, the red, green, and blue color filters may be made thinner to reduce the amount of light absorbed by the color filters so as to increase the light transmittance. As a result, the screen may become bright. If, however, the color filters are made thinner in this manner, the transmittance in the absorption wavelength range of each of colored light beams, i.e., red, green, and blur light beams, increases, and the color balance between light beams of the respective colors deteriorates, as shown in FIG. 28. As a result, a good white display cannot be obtained.

FIG. 28 shows changes in spectral transmittance with reductions in the thicknesses of color filters. As shown in FIG. 28, according to the spectral distribution (solid line) of red light transmitted through a red filter, the light transmittance on the short wavelength side as the absorption wavelength range of the red filter is high, as indicated by the dashed line. According to the spectral distributions (solid lines) of green light and blue light which are respectively transmitted through the green and blue filters, the half widths of the light transmittances tend to increase. As a result, the spectral transmittance of the color light mixture exhibits a high peak of transmittance at a wavelength in the neighborhood of 500 nm. In a liquid crystal display device having thin color filters, therefore, the transmittance in the absorption wavelength range of each of colored light beams, i.e., red, green, and blur light beams, increases, and hence the purity of each color deteriorates. In addition, since the color balance between light beams of the respective colors is poor, the display color obtained by additive color mixture becomes close to cyan (bluish green).

As described above, the screen of the conventional reflection type color liquid crystal display device is dark because of light absorption in the color filters. Even if the amount of light absorbed by each color filter is decreased, the color balance suffers. As a result, a satisfactory white display cannot be obtained.

BRIEF SUMMARY OF THE INVENTION

It is an object of the present invention to provide a color liquid crystal display device which has color filters and can display a high-quality color image with sufficient brightness and good color balance.

In order to achieve the above object, according to the first aspect of the present invention, there is provided a liquid crystal display device comprising:

a pair of substrates placed to oppose each other;

a plurality of first electrodes formed on one of opposing surfaces of the pair of substrates;

at least one second electrode formed on the other of the opposing surfaces to oppose the plurality of first electrodes so as to form a plurality of pixel areas defined by areas where the second electrode opposes the first electrodes;

coloring films formed on one of inner surfaces of the pair of substrates in correspondence with the pixel areas, the coloring film having an area smaller than an area of the pixel area; and a liquid crystal layer sandwiched between the pair of substrates.

According to the liquid crystal display device of the present invention, the area of each of the color filters arranged on the inner surface of one of the substrates in correspondence with the pixel area is set to be smaller than that of each pixel area to form non-colored light exit areas, and one pixel is displayed with non-colored light which is not transmitted through any color filter and colored light which is transmitted through the color filter. Since this non-colored light is bright white light, the luminance of each pixel is high, and a bright color image can be displayed.

According to this liquid crystal display device, a bright reflection type color liquid crystal display device can be obtained by further including a reflecting member for reflecting light incident from the front side of the device and transmitted through the liquid crystal layer toward the front side.

In this liquid crystal display device, the color filters of a plurality of colors are arranged in the substantially central portions of the pixel areas except for their peripheral portions, and each of the pixel areas is constituted by a non-colored light exit area formed on the peripheral portion and a colored light exit area formed in the central portion. According to the liquid crystal display device having this structure, since the boundaries between the adjacent pixel areas are non-colored light transmission areas, the amount of light absorbed when the light is transmitted through one pixel area and reflected by the reflecting means formed on the rear-side substrate side to be incident on an adjacent pixel area of a different color can be reduced.

In addition, in this liquid crystal display device, each of the color filters of the plurality of colors has an area smaller than that of each pixel area and is formed into an oblong shape such that a dimension along a horizontal direction when viewed from the front side of the device is smaller than a dimension in a direction perpendicular to the horizontal direction, and/or the non-colored light exit areas are arranged in the vertical direction, thereby reducing the amount of light absorbed when the light is transmitted through one pixel area and reflected after being transmitted through the liquid crystal layer to be incident on an adjacent pixel area of another color.

In this liquid crystal display device, the pixel area comprises a colored light exit area having a plurality of coloring films arranged on a surface parallel to the front-side substrate surface to be divided in a direction along the horizontal direction when viewed from the front side of the device. With this structure, the areas between the divided coloring films serve as oblong non-colored light exit areas, thereby further increasing the luminance of each color pixel.

In this liquid crystal display device, the pixel area comprises a colored light exit area having a plurality of coloring films arranged on a surface parallel to the substrate surface to be divided in a direction perpendicular to the horizontal direction when viewed from the front side of the device. With this structure, non-colored light exit areas extending in the horizontal direction with respect to the front-side substrate are formed so that light incident on the front-side substrate from the upper side can be reflected with a high luminance.

In this liquid crystal display device, the coloring films of the respective colors, arranged in the pixel areas, are alternately shifted in a direction perpendicular to the horizontal direction when viewed from the front side of the device. With this arrangement, both light entering the front-side substrate from the vertical direction and light entering the front-side substrate from the horizontal direction can be efficiently reflected to obtain a high luminance.

In this liquid crystal display device, reflecting members for reflecting incoming light from the front side of the device toward the front side are arranged on the inner surface of the front-side substrate in correspondence with the inter-pixel areas between the respective pixel areas, thereby increasing the intensity of reflected light from the portions between the respective pixel areas. With this structure, the overall luminance of the screen can be further increased.

According to a liquid crystal display device of the second aspect of the present invention, in the liquid crystal display device of the first aspect, the coloring film comprises a coloring film which transmits light in an intermediate wavelength range in the visible range, a coloring film which transmits light in a long wavelength range, and a coloring film which transmits light in a short wavelength range, thicknesses of the coloring films increasing in the order named, and the thicknesses of the coloring films being set such that a color gamut defined by color coordinates of the respective coloring films is maximized.

In this liquid crystal display device, the thicknesses of the color filters of the primary colors which are arranged in the pixel areas are set such that the coloring film with the long wavelength range is thicker than the coloring film with the intermediate wavelength range, and the coloring film with the short wavelength range is thicker than the coloring film with the long wavelength range. With this setting, colored light transmitted through the respective coloring films increases the color gamut in which colors can be expressed, and the screen can be made sufficiently bright without deterioration in color balance. Therefore, a color display having a large color gamut can be provided.

In this liquid crystal display device, the coloring films are color filters of primary colors of red, green, and blue, and the thicknesses of the color filters of the respective colors are set such that the area of the color gamut becomes not less than 750 on the a*b* plane on the CIE 1976 L*a*b L*a*b color system. With this setting, the color gamut in which colors can be expressed can be increased, and the screen can be made sufficiently bright without deterioration in color balance.

In this liquid crystal display device, the thicknesses of the color filters of the respective colors are set such that a white chroma of a mixture of colored light beams transmitted through the color filters of the respective colors becomes not more than 1.5 on the a*b* plane on the CIE 1976 L*a*b L*a*b color system. With this setting, a color display with good color balance can be realized.

In this liquid crystal display device, the color filters of the respective colors comprise red, green, and blue filters using a pigment-dispersed material, the red filter having a thickness of 0.9 to 1.2 $\mu$m, the green filter having a thickness of 0.8 to 1.1 $\mu$m. and the blue filter having a thickness of 1.1 to 1.4 $\mu$m. With this arrangement, the conditions for the above color gamut and the white chroma of the color light mixture can be satisfied.

In this liquid crystal display device, the color filters of the respective colors respectively have different area ratios, and the area ratios with respect to the pixel area increase in the order of a coloring film which transmits light in the intermediate wavelength range, a coloring film which transmits light in the short wavelength range, and a coloring film which transmits light in the long wavelength range. With this arrangement, a larger color gamut and a better color balance can be obtained.

In this liquid crystal display device, the red, green, and blue filters respectively have thicknesses of 0.9 to 1.2 $\mu$m, 0.8 to 1.1 $\mu$m, and 1.1 to 1.4 $\mu$m, and area ratios of 90 to 95%, 60 to 65%, and 75 to 80% with respect to the pixel area. With this arrangement, a larger color gamut and a better color balance can be obtained.

According to a liquid crystal display device of the third aspect of the present invention, in the liquid crystal display device of the first aspect, the liquid crystal layer has a first liquid crystal layer of a thickness d1 corresponding to an area in which the coloring film is formed, and a second liquid crystal layer of a thickness d2 corresponding to an area other than the area in which the coloring film is formed, and products $\Delta$nd1 and $\Delta$nd2 of the liquid crystal thicknesses d1 and d2 and a refractive index anisotropy $\Delta$n of the liquid crystal layer are set such that a spectral transmittance distribution obtained by synthesizing a spectral transmittance distribution of light transmitted through a liquid crystal element having the product $\Delta$nd1 and a spectral transmittance distribution of light transmitted through a liquid crystal element having the product $\Delta$nd2 becomes substantially flat in the visible range.

In this liquid crystal display device, since the spectral transmittance distribution obtained by synthesizing the spectral transmittance distribution of light transmitted through the liquid crystal element having the product $\Delta$nd1 and the spectral transmittance distribution of light transmitted through the liquid crystal element having the product $\Delta$nd2 is set to be substantially flat in the visible range, light having a flat wavelength distribution can be output.

In this liquid crystal display device, an area, of the pixel area, which corresponds to the color filter serves as a filter area, and an area, of the pixel area, which does not correspond to the color filter serves as a non-filter area. In this structure, let d represent the thickness of the liquid crystal layer sandwiched between the pair of substrates, $\Delta$n represent the refractive index, and Δnd represent the product of the thickness and the refractive index. Then, when the filter and non-filter areas having different products Δnd are present in one pixel area, the screen can be made sufficiently bright, and a color image with good color balance can be displayed by selecting liquid crystal layer thicknesses that compensate for the difference between the spectral transmittance distributions of light components transmitted through the two areas.

In this liquid crystal display device, the products Δnd1 and Δnd2 satisfy $$\Delta nd1 < \Delta nd0 < \Delta nd2$$

where d0 is the liquid crystal thickness at which the transmittance exhibits a maximum value as the product Δnd of the liquid crystal layer is changed. With this setting, by selecting liquid crystal thicknesses that compensate for the difference between the spectral transmittance distributions of the transmitted light components, the screen can be made sufficiently bright, and a color image with good color balance can be displayed.

In the liquid crystal display device of the first aspect, a liquid crystal display device according to the fourth aspect of the present invention further comprises first and second aligning films respectively formed on the inner surfaces of a pair of substrates, and a pair of polarizing plates arranged outside the pair of substrates to sandwich the substrates, wherein the first aligning film formed on the front-side substrate on which light is incident has undergone an aligning treatment within a range of 0° to 45° in a counterclockwise direction with respect to a horizontal direction when the liquid crystal display device is viewed from the front side, and the second aligning film formed on the rear-side substrate opposing the front-side substrate has undergone an aligning treatment in a direction crossing the aligning treatment direction of the first aligning film at 90°.

In this liquid crystal display device, the aligning direction of the liquid crystal molecules, of the liquid crystal cell, which are located near the rear-side substrate is set within the angle range of 0° to 45° in the counterclockwise direction with respect to the abscissa of the display surface when viewed from the front side, and the liquid crystal molecules are twisted clockwise, from the rear-side substrate to the front-side substrate, at a twist angle of about 90° with respect to the aligning direction of the liquid crystal molecules near the rear-side substrate. With this alignment, even in a reflection type TN liquid crystal display device, a display observed from normal direction can be made sufficiently bright while satisfactory contrast is maintained.

In this liquid crystal display device, liquid crystal molecules, of the liquid crystal layer, which are located near the rear-surface substrate are aligned counterclockwise in a direction within an angle range of 5° to 30° with respect to the horizontal direction when viewed from the front-side substrate. With this alignment, a brighter display can be provided. In addition, in this liquid crystal display device, liquid crystal molecules, of the liquid crystal layer, which are located near the rear-surface substrate are aligned counterclockwise in a direction within an angle range of about 10° to about 25° with respect to the horizontal direction when viewed from the front-side substrate. With this alignment, a brighter display can be provided.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Liquid crystal devices will be described below as embodiments of the present invention with reference to the accompanying drawings.

[First Embodiment]

FIGS. 1 to 19 show the first embodiment of the present invention.

Figure 1:
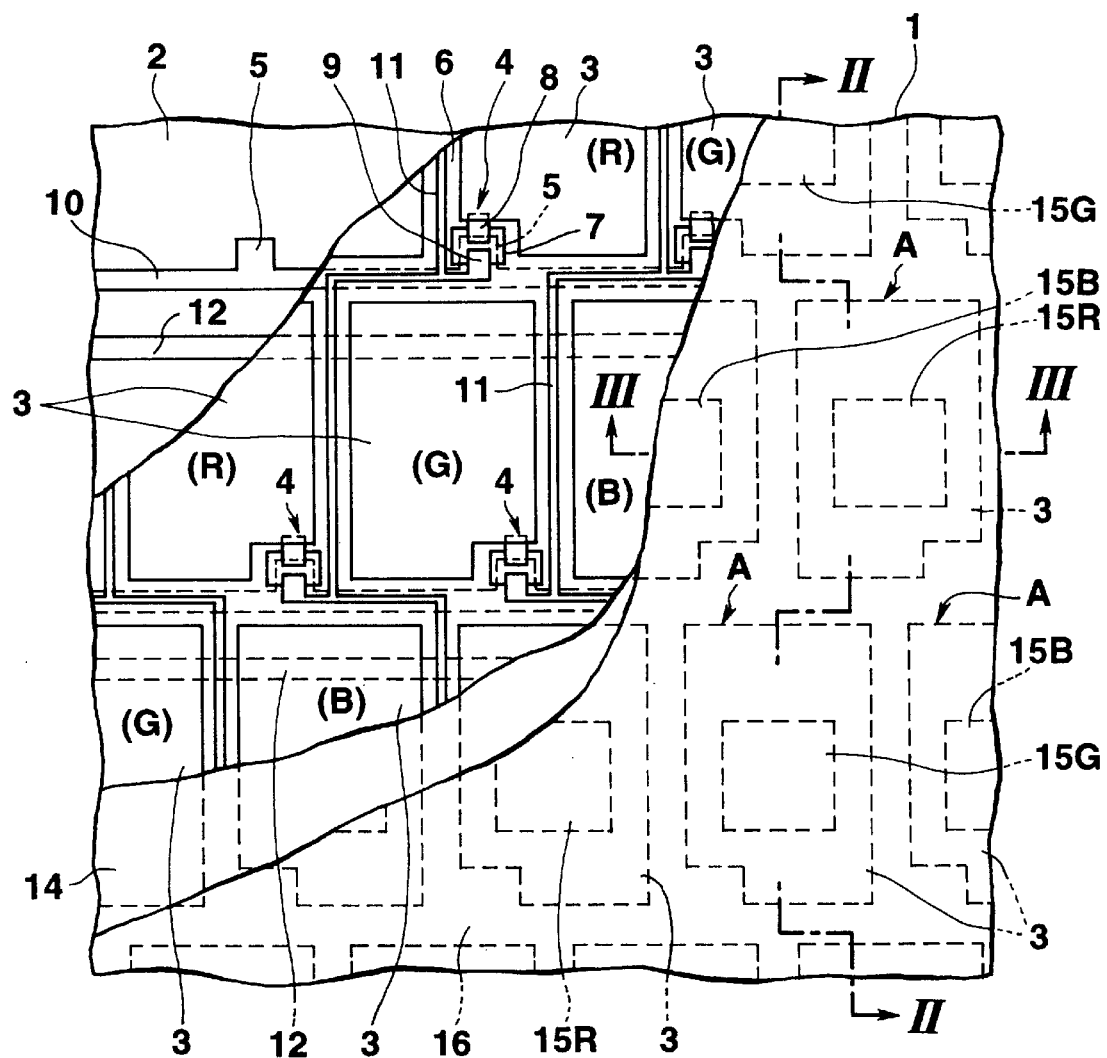
FIG. 1 is a plan view showing a liquid crystal display device according to the first embodiment of the present invention.
Figure 2:
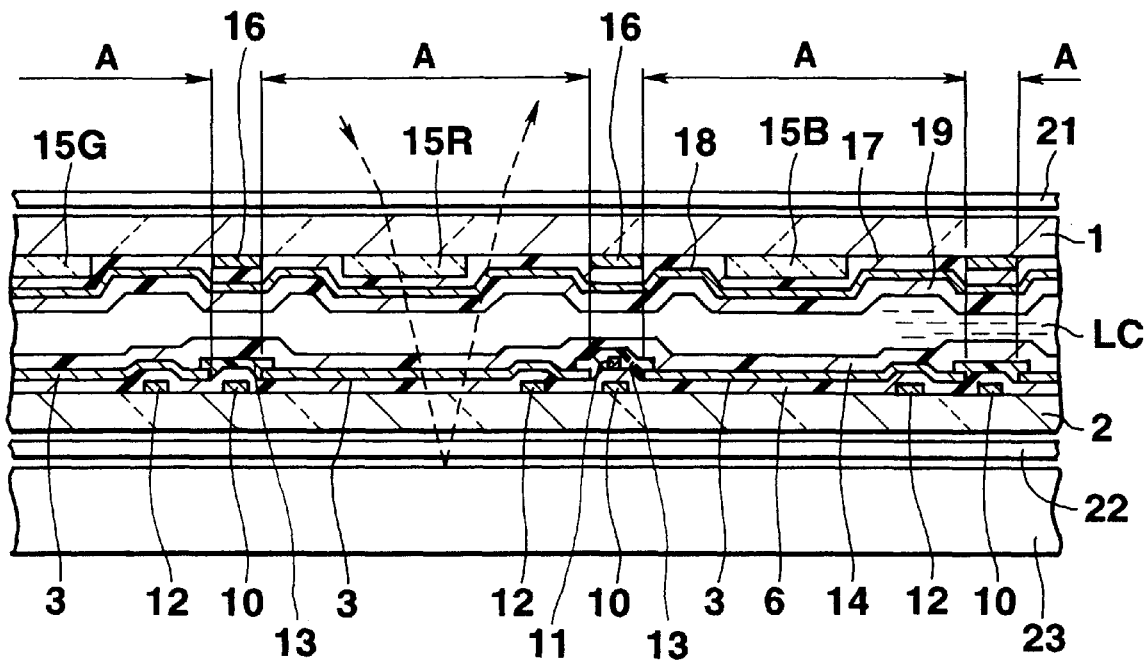
FIG. 2 is a sectional view taken along a line II—II in FIG. 1.
Figure 3:
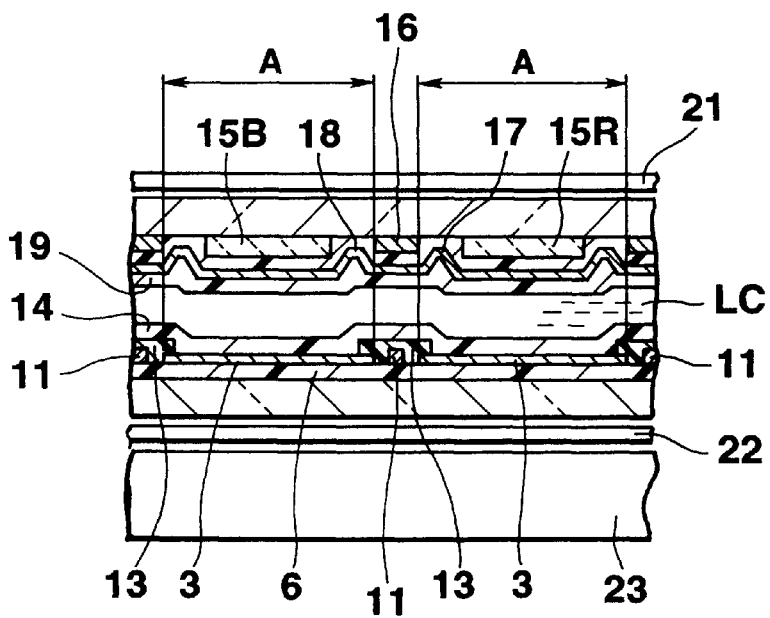
FIG. 3 is a sectional view taken along a line III—III in FIG. 1.
Figure 4:
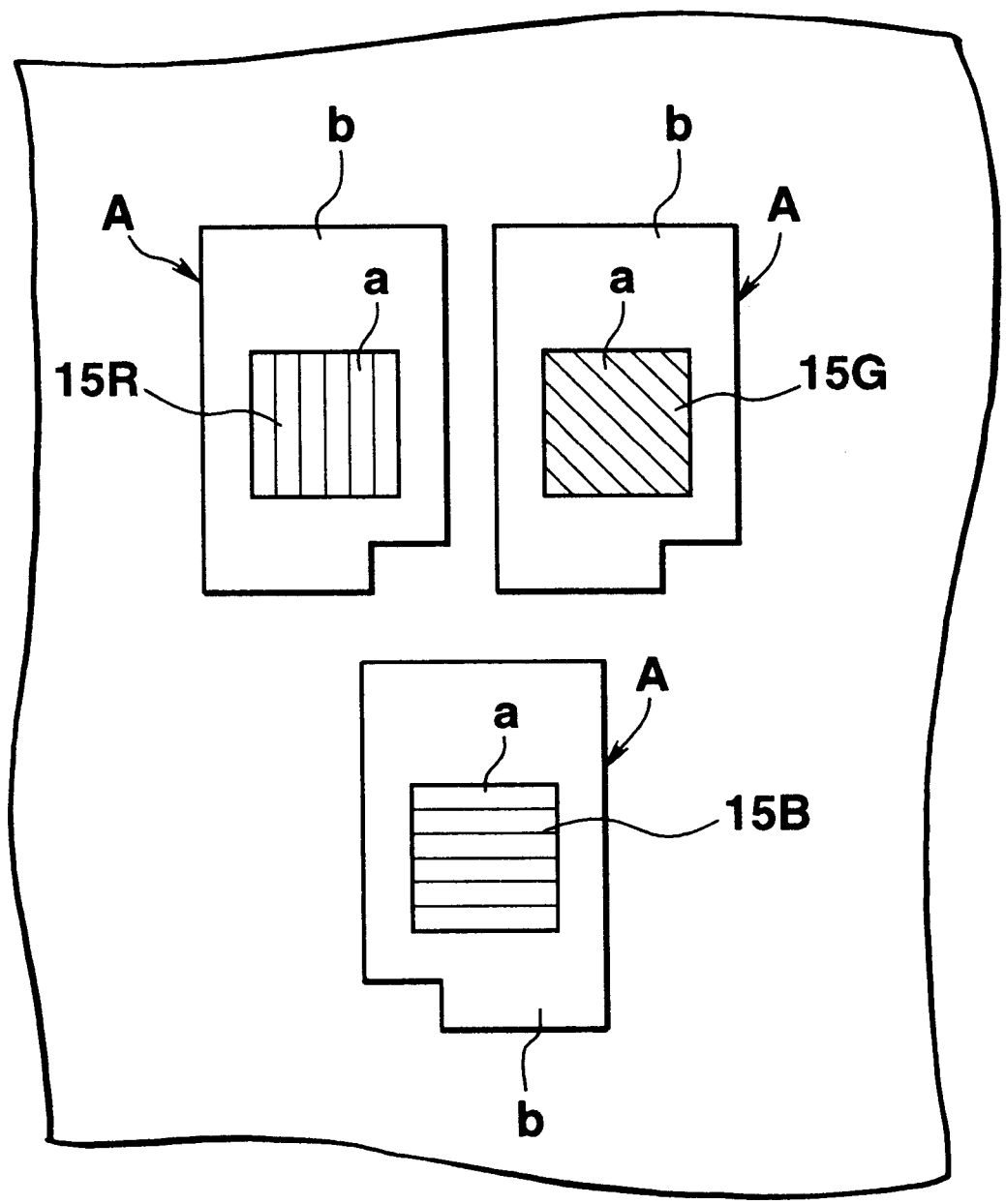
FIG. 4 is a plan view showing the arrangement of pixels and color filters of the liquid crystal display device according to the first embodiment.

FIG. 1 is a plan view showing part of a liquid crystal display device according to the present invention. FIG. 2 is a sectional view taken along a line II—II in FIG. 1. FIG. 3 is a sectional view taken along a line III—III in FIG. 1. FIG. 4 is a plan view showing the arrangement of pixels and color filters.

The liquid crystal display device of the present embodiment is of an active matrix type and uses TFTs (thin-film transistors) as active elements. Transparent pixel electrodes 3 are arranged on the inner surface of a rear-side substrate 2 of a pair of substrates (transparent substrates such as glass plates) 1 and 2 in the form of a matrix. A plurality of active elements (to be referred to as TFTs hereinafter) 4 using TFTs are connected to the respective pixel electrodes 3.

Each TFT 4 is constituted by a gate electrode 5 and a capacitance formation electrode 12 which are formed on the rear-side substrate 2, a gate insulating film 6 covering the gate electrode 5 and the capacitance formation electrode 12, an i-type semiconductor film 7 formed on the gate insulating film 6 to oppose the gate electrode 5, and source and drain electrodes 8 and 9 which are respectively formed on the source and drain regions of the i-type semiconductor film 7 through an n-type semiconductor film (not shown) doped with an impurity.

A gate line 10 is formed on the rear-side substrate 2 to extend along one side of each pixel electrode row so as to supply a gate signal to each TFT 4 on each row. The gate electrodes 5 of the TFTs 4 on each row are integrally formed with the gate line 10 corresponding to the row.

The gate insulating film (transparent film) 6 of the TFTs 4 is formed on almost the entire surface of the substrate 2. The gate lines 10 are covered with the gate insulating film 6 except for the terminal portions of the gate lines 10.

A data line 11 is formed on the gate insulating film 6 to extend along one side of each pixel electrode column so as to supply a data signal to each TFT 4 on each column. The drain electrodes 9 of the TFTs 4 on each column are connected to the data line 11 corresponding to the column.

In this embodiment, the data lines 11 are formed on the gate insulating film 6, and the drain electrodes 9 of the TFTs 4 on each column are integrally formed with the data line 11 corresponding to the column.

The pixel electrode 3 is formed on the gate insulating film 6. This pixel electrode 3 is connected to the source electrode 8 of the corresponding TFT 4 at an end portion of one side edge of the pixel electrode 3.

Overcoat insulating film 13 is formed on the inner surface of the rear-side substrate 2 to cover the TFTs 4, the data lines 11, and the peripheral portions of the pixel electrodes 3. An aligning film 14 is formed on the overcoat insulating film 13.

Color filters 15R, 15G, and 15B of a plurality of colors, e.g., primary colors, i.e., red, green, and blue, are formed on the inner surface of the front-side substrate 1, which becomes a display surface, in correspondence with the respective pixel electrodes 3 on the rear-side substrate 2. In addition, black masks 16 are formed in the regions between the color filters, and a transparent protective insulating film 17 is formed to cover the black masks 16. A transparent counter electrode 18 is formed on the protective insulating film 17 to oppose all the pixel electrodes 3. Pixel areas A are respectively formed by the portions where the counter electrode 18 opposes the pixel electrodes 3.

Note that the protective film (insulating film) 17 can be omitted by properly selecting the material for the color filters 15R, 15G, and 15B.

The color filters 15R, 15G, and 15B are alternately arranged at equal intervals in the row and column directions in the order of the red filter 15R, the green filter 15G, and the blue filter 15B. These color filters 15R, 15G, and 15B respectively correspond to the different pixel areas A.

Each of the color filters 15R, 15G, and 15B of the respective colors has an area smaller than that of each pixel area where each pixel electrode 3 corresponds to the counter electrode 18. In this embodiment, each of the color filters 15R, 15G, and 15B of the respective colors is placed to correspond to the inner area of each pixel area except for its peripheral portion.

The front-side substrate 1 and the rear-side substrate 2 are joined to each other through a frame-like seal member (not shown). A liquid crystal LC is filled in the area surrounded by the seal member between the two substrates 1 and 2.

The surfaces of aligning films (horizontal aligning films made of polyimide or the like) 19 and 14 respectively formed on the inner surfaces of the pair of substrates 1 and 2 are rubbed to undergo aligning treatments in predetermined directions. The aligning directions of the liquid crystal molecules, of the liquid crystal LC filled in the area between the two substrates 1 and 2, which are located near the substrates 1 and 2 are regulated by the aligning film 19 on the front-side substrate 1 and the aligning film 14 on the rear-side substrate 2 such that the liquid crystal molecules are twisted at a predetermined twist angle (e.g., almost 90°) between the substrates 1 and 2.

Polarizing plates 21 and 22 are respectively placed on the outer surfaces of the pair of substrates 1 and 2. These polarizing plates 21 and 22 are placed such that their optical axes (transmission or absorption axes) are set in predetermined directions.

A reflecting member 23 is placed on the rear side of the polarizing plate 22 on the rear side to reflect external light which enters the liquid crystal display device from its front side and transmitted through the liquid crystal layer. This reflecting member or reflecting plate 23 is made of a white scattering reflecting plate.

This liquid crystal display device is of reflection type, which displays using external light. In this device, of the light (linearly polarized light) which is incident on each pixel area A through the front-side polarizing plate 21, light transmitted through the inner area of the corresponding pixel area A except for its peripheral portion enters a corresponding one of the color filters 15R, 15G, and 15B corresponding to the pixel area A. As a result, light components in the absorption wavelength range of the color filter are absorbed by the color filter, and the light is colored with the color of the color filter. The colored light is sequentially transmitted through the liquid crystal layer and the rear-side polarizing plate 22 and reflected by the reflecting member 23. The reflected light is sequentially transmitted through the rear-side polarizing plate 22, the color filter, and the front-side polarizing plate 21 to emerge from the front side.

Of the incoming light on each pixel area A, light incident on the peripheral portion of the pixel area A, i.e., the area outside a corresponding one of the color filters 15R, 15G, and 15B, is sequentially transmitted through the liquid crystal and the rear-side polarizing plate 22 without passing through the color filter and reflected by the reflecting member 23. The reflected light is sequentially transmitted through the liquid crystal layer and the front-side polarizing plate to emerge from the front side.

According to this liquid crystal display device, the area of each of the color filters 15R, 15G, and 15B is smaller than that of each pixel area A. For this reason, of the light transmitted through the pixel areas A, light components in the absorption wavelength ranges of the color filters 15R, 15G, and 15B, of only light incident on the color filters, are absorbed and colored, whereas the remaining light components are transmitted as high-luminance non-colored light through the color filters without being absorbed by the color filters. As a result, color pixels are displayed with the non-colored light and the colored light.

If, for example, priority is given to white display over black display, the black masks 16 arranged between the pixel areas A may be omitted to form bright display areas W from which incident light always emerges toward the front side of the device after being reflected by the scattering reflecting member 23, the gate lines 10, the data lines 11, and the like, thereby obtaining a bright display.

FIG. 4 is a plan view showing the arrangement of pixels and color filters of the liquid crystal display device of the first embodiment. As shown in FIG. 4, each pixel area A is constituted by a non-colored light exit area b (a white area corresponding to the color of the reflecting member 23), which is formed on the peripheral portion of the pixel area and through which high-luminance non-colored light is transmitted, and a colored light exit area a, which is formed on the central portion of the pixel area and through which light colored with the color of the color filter is transmitted. Light components which are respectively transmitted through the colored light exit area a and the non-colored light exit area b mix with each other. As a result, the pixel area A is observed as one color display pixel.

According to the above liquid crystal display device, therefore, the display pixels to be displayed are colored with the colors of the color filters 15R, 15G, and 15B with sufficient luminances. Although this liquid crystal display device is of reflection type that displays by reflecting external light incident from the front side by the reflecting member 23, a satisfactory bright color image can be displayed.

Assume that in a reflection type liquid crystal display device, light incident near the edge portion of each pixel area A is reflected by the reflecting member and transmitted through a portion near the edge portion of an adjacent pixel area to emerge. In this case, in a conventional liquid crystal display device, since each color filter corresponds to an entire corresponding pixel area, the light incident near the edge portion of the pixel area is colored with the color of the color filter, and the light reflected by the reflecting member and incident near the edge portion of the adjacent pixel area is absorbed by the adjacent color filter of a different color and does not emerge from the front surface of the display device. As a result, each display pixel becomes dark.

According to the liquid crystal display device of the above embodiment, however, since the area of each of the color filters 15R, 15G, and 15B is smaller than that of each pixel area A, light incident near the edge portion of each pixel area A is reflected as non-colored light. Even if, therefore, this light is incident near the edge portion of an adjacent pixel area, since no color filter is formed on the peripheral portion of the adjacent pixel area, the light is transmitted through the edge portion without being absorbed. For this reason, the luminance of the light emerging from the front surface of the display device does not decrease.

In the above embodiment, each pixel area. is formed to have a nearly rectangular shape. However, the present invention is not limited to this. For example, each pixel area may be formed to have a substantially elliptical or circular shape to decrease the length of the contour of each of the color filters 15R, 15G, and 15B as compared with the rectangular color filters. With this structure, the lengths of stepped portions formed along the peripheries of the pixel areas are decreased to prevent a decrease in contrast due to leakage light generated when the aligned state of liquid crystal molecules at the stepped portions is disturbed.

In the above embodiment, the color filters 15R, 15G, and 15B are formed on the substrate 1 on which the counter electrode 18 is formed. However, these filters may be formed on the substrate 2 on which the pixel electrodes 3 are formed.

In the first embodiment, each color filter is formed by a color filter using a pigment-dispersed material. A thickness t(R) of the red filter 15R which transmits light in a long wavelength range, a thickness t(G) of the green filter 15G which transmits light in an intermediate wavelength range, and a thickness t(B) of the blue filter 15B which transmits light in a short wavelength range are set to satisfy t(G)<t(R)<t(B).

Figure 5:
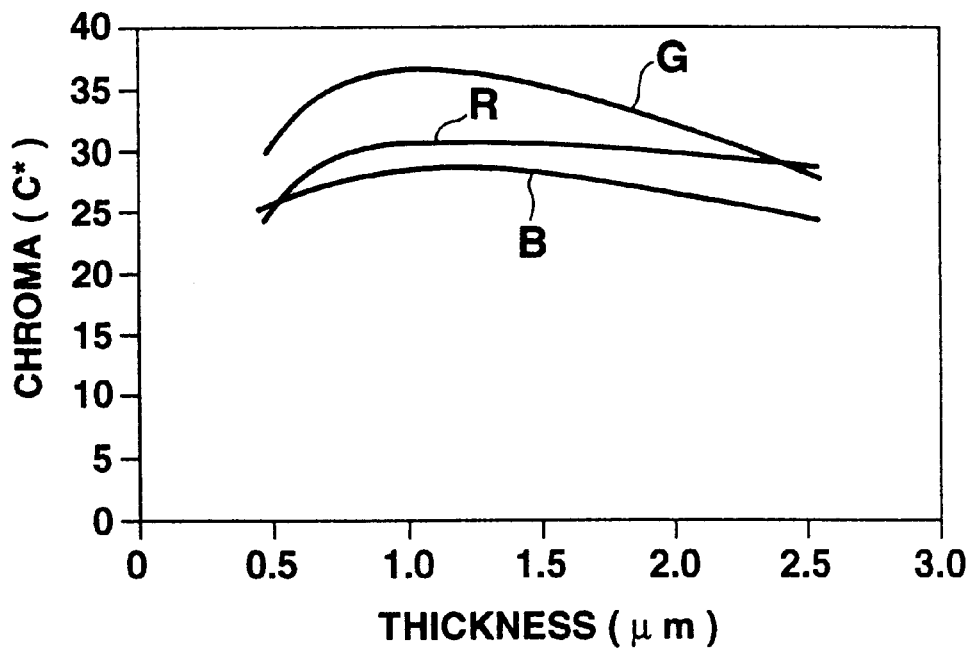
FIG. 5 is a graph showing the relationship between the thickness of each color filter and the chroma in the liquid crystal display device according to the first embodiment.

A chroma $C^*$ of colored light produced when light is transmitted through each color filter changes with a change in the thickness of the color filter, as shown in FIG. 5.

FIG. 5 shows changes in the chromas $C^*$ (on the CIE 1976 $L^*a^*b$ $L^*a^*b$ color system) of colored light beams transmitted through the red, green, and blue color filters 15R, 15G, and 15B with changes in the thicknesses t(R), t(G), and t(B) of the color filters. The above chromas $C^*$ indicate the distances from the C light source (the achromatic color point defined by a*=0 and b*=0) on the a*b* plane on the CIE 1976 L*a*b L*a*b color system to the color coordinate points of the respective colored light beams of red, green, and blue. As shown in this graph, the chromas C* of the respective colored light beams have their own maximum values with respect to changes in the thicknesses of the color filters through which the light beams are transmitted, and the thicknesses of the respective color filters exhibiting these maximum values have the following relationship:

$$t(G)<t(R)<t(B)$$

The thicknesses of the respective color filters exhibiting these maximum values fall within the following ranges:

red filter thickness t(R)=0.9 to 1.2 μM green filter thickness t(G)=0.8 to 1.1 μm blue filter thickness t(B)=1.1 to 1.4 μm When, therefore, the thicknesses t(R), t(G), and t(B) of the color filters 15R, 15G, and 15B are set to the thicknesses at which the chromas C* of the colored light beams transmitted through the respective color filters essentially exhibit maximum values, the area surrounded by the color coordinate points of the above three colored light beams on the a*b* plane on the CIE 1976 L*a*b L*a*b color system, i.e., the color gamut, can be increased, and many colors can be displayed.

Figure 6:
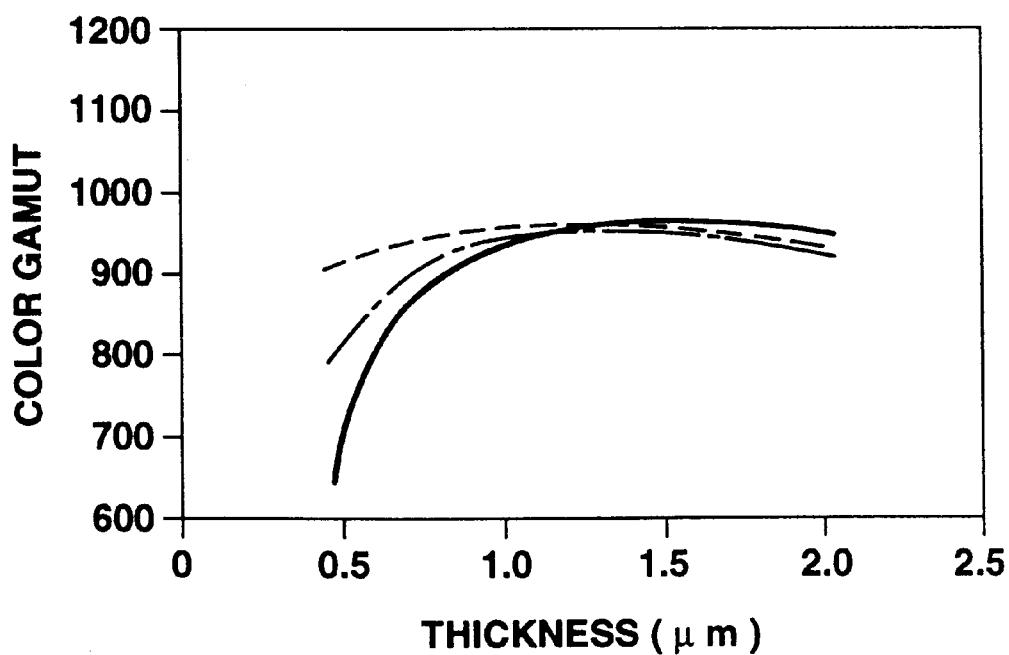
FIG. 6 is a graph showing the relationship between the thickness of each color filter and the color gamut in the liquid crystal display device according to the first embodiment.
Figure 7:
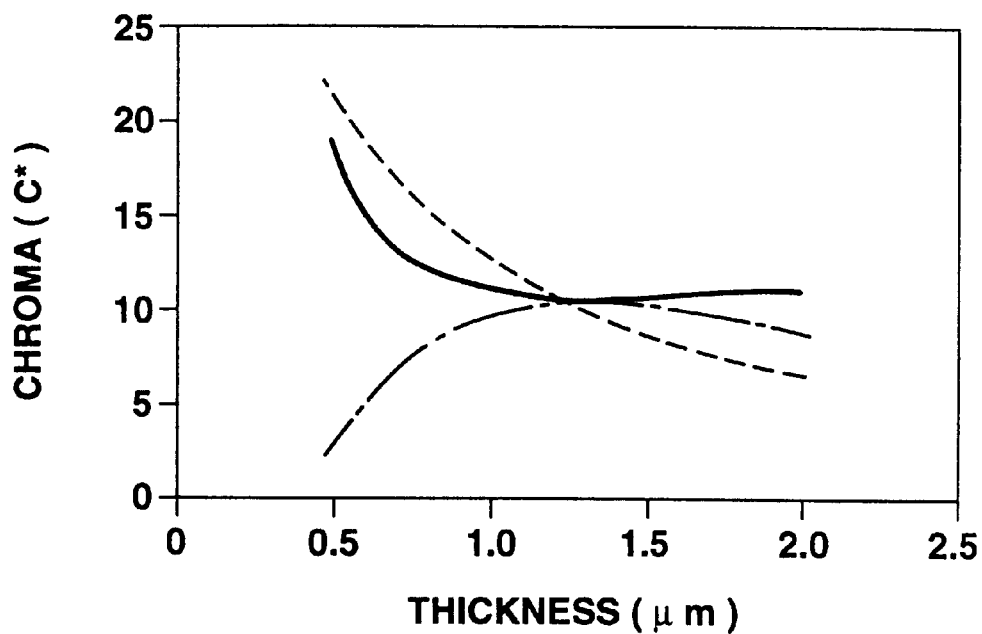
FIG. 7 is a graph showing the relationship between the thickness of each color filter and the chroma of a color light mixture in the liquid crystal display device according to the first embodiment.
Figure 8:
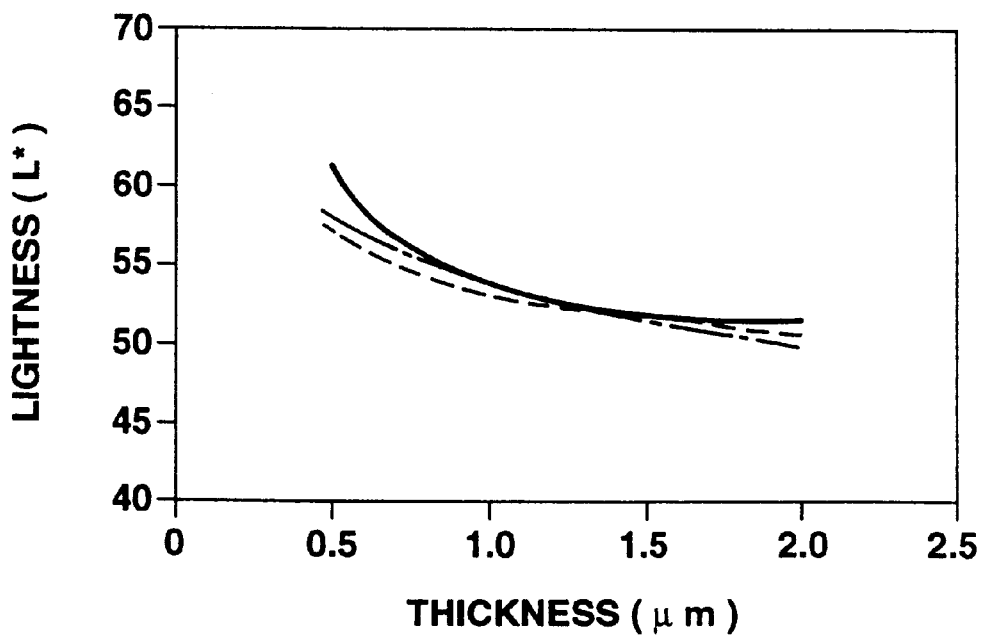
FIG. 8 is a graph showing the relationship between the thickness of each color filter and the lightness in the liquid crystal display device according to the first embodiment.

FIGS. 6 to 8 show changes in the characteristics (on the CIE 1976 L*a*b L*a*b color system) of the display colors of color light mixtures transmitted through the pixel areas of the respective colors, i.e., the respective colors displayed by colored light beams as light beams emerging from the areas a, of the pixel areas A, which correspond to the filters, and non-colored light beams as light emerging from the non-colored light exit areas b of the pixel areas A, with changes in the thicknesses of the color filters of the respective colors. Each graph shows the characteristics obtained when the area of each of the color filters 15R, 15G, and 15B is set to 80% of the area of each pixel area A. FIG. 6 shows changes in color gamut characteristics; FIG. 7, changes in chroma characteristics; and FIG. 8, changes in lightness characteristics.

Referring to FIG. 6, the solid line indicates characteristics obtained when the thicknesses t(G) and t(B) of the two color filters 15G and 15B of green and blue are fixed to 1.5 μm, and only the thickness t(R) of the red filter 15R is changed, the chain line indicates characteristics obtained when the thicknesses t(R) and t(B) of the two color filters 15R and 15B of red and blue are fixed to 1.5 μm, and only the thickness t(G) of the green filter 15G is changed, and the dashed line indicates characteristics obtained when the thicknesses t(R) and t(G) of the two color filters 15R and 15G of red and green are fixed to 1.5 μm, and only the thickness t(B) of the blue filter 15B is changed.

As indicated by the filter thickness-color gamut characteristics in FIG. 6, when the red filter thickness t(R)=0.9 to 1.2 μm, the green filter thickness t(G)=0.8 to 1.1 μm, and the blue filter thickness t(B)=1.1 to 1.4 μm, the above color gamut essentially exhibits the maximum value.

Referring to FIG. 7, the solid line indicates characteristics obtained when the thicknesses t(G) and t(B) of the two color filters 15G and 15B of green and blue are fixed to 1.5 μm, and only the thickness t(R) of the red filter 15R is changed, the chain line indicates characteristics obtained when the thicknesses t(R) and t(B) of the two color filters 15R and 15B of red and blue are fixed to 1.5 μm, and only the thickness t(G) of the green filter 15G is changed, and the dashed line indicates characteristics obtained when the thicknesses t(R) and t(G) of the two color filters 15R and 15G of red and green are fixed to 1.5 μm, and only the thickness t(B) of the blue filter 15B is changed.

As indicated by the filter thickness-chroma characteristics in FIG. 7, when the red filter thickness t(R)=0.9 to 1.2 μm, the green filter thickness t(G)=0.8 to 1.1 μm, and the blue filter thickness t(B)=1.1 to 1.4 μm, the chromas C* of the above color light mixtures become small values.

When the chroma of the color light mixture becomes a small value, the color of the color light mixture becomes close to the C light source on the a*b* plane on the CIE 1976 L*a*b L*a*b color system. As a result, the color of the color light mixture becomes a more achromatic, good white color beam.

Referring to FIG. 8, the solid line indicates characteristics obtained when the thicknesses t(G) and t(B) of the two color filters 15G and 15B of green and blue are fixed to 1.5 μm, and only the thickness t(R) of the red filter 15R is changed, the chain line indicates characteristics obtained when the thicknesses t(R) and t(B) of the two color filters 15R and 15B of red and blue are fixed to 1.5 μm, and only the thickness t(G) of the green filter 15G is changed, and the dashed line indicates characteristics obtained when the thicknesses t(R) and t(G) of the two color filters 15R and 15G of red and green are fixed to 1.5 μm, and only the thickness t(B) of the blue filter 15B is changed.

As indicated by the filter thickness-lightness characteristics in FIG. 8, the lightnesses (L*) of color light mixtures obtained when the thicknesses t(R), t(G), and t(B) of the red, green, and blue filters 15R, 15G, and 15B fall within the above ranges (t(R)=0.9 to 1.2 μm, t(G)=0.8 to 1.1 μm, and t(G)=1.1 to 1.4 μm). With these lightnesses (L*), a sufficiently bright display can be obtained.

Although the lightness (L*) of the color light mixture increases as the filter thickness decreases, the chroma of the colored light decreases as the filter thickness decreases. As a result, the color gamut decreases. For this reason, the thicknesses t(R), t(G), and t(B) of the red, green, and blue filters 15R, 15G, and 15B preferably fall within the above ranges.

In the above embodiment, the color filters are used as coloring films. However, the coloring films are not limited to color filters. The liquid crystal display device of the above embodiment displays a full color image by additive color mixture of red, green, and blue light beams. However, the present invention can be applied to a liquid crystal display device having magenta, yellow, and cyan coloring films (e.g., color filters) to display a full color image by subtractive color mixture. In this case as well, the thicknesses of the coloring films of the primary colors are set to satisfy a relation: the thickness of the long wavelength range transmission coloring film<the thickness of the intermediate wavelength range transmission coloring film<short wavelength range transmission coloring film, and the thicknesses of the coloring films of the primary colors are set such that colored light beams transmitted through the respective coloring film essentially exhibit the maximum chromas. With this setting, the coloring films can increase the color gamut and prevent a deterioration in color balance, thereby making the screen sufficiently bright.

To further improve the color balance, the area of each color filter is set as follows.

Figure 9:
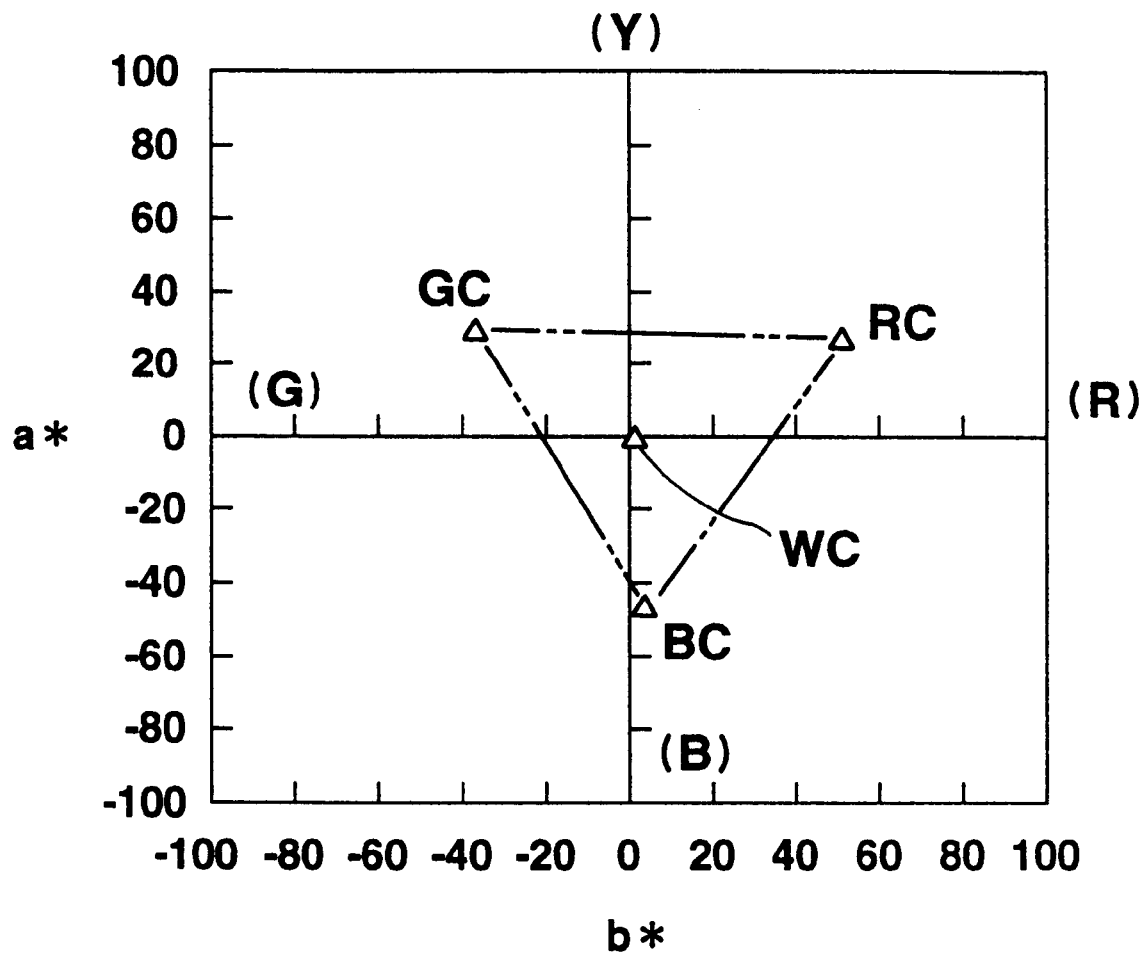
FIG. 9 is a graph showing the characteristics of the liquid crystal display device of the first embodiment on the CIE 1976 L*a*b L*a*b color system.

FIG. 9 shows the coordinates of red, green, and blue light beams from the liquid crystal display device of the first embodiment on the a*b* plane on the CIE 1976 L*a*b L*a*b color system.

The thicknesses and areas of the color filters of this liquid crystal display device are set such that the area of the color gamut surrounded by the triangle connecting color coordinates RC of a red light beam transmitted through the red filter 15R, color coordinates GC of a green light beam transmitted through the green filter 15G, and color coordinates BC of a blue light beam transmitted through the blue filter 15B is nearly maximized, and the chroma (C*) of a mixture of the red, green, and blue light beams, which is indicated by color coordinates WC, is nearly minimized.

Consider the area ratios of the red, green, and blue filters 15R, 15G, and 15B with respect to the pixel areas A of the respective colors. Let s(R) be the area ratio of the red filter 15R through which light in the long wavelength range is transmitted, s(G) be the area ratio of the green filter 15G through which light in the intermediate wavelength range is transmitted, and s(B) be the area ratio of the blue filter 15B through which light in the short wavelength range is transmitted.

Then, in this embodiment, the thicknesses of the respective color filters are set according to t(G)<t(R)<t(B), and the area ratios are set according to s(R)>s(B)>s(G). With this setting, the area of the color gamut surrounded by the triangle connecting the color coordinates RC, GC, and BC of red, green, and blue light beams on the above color system is increased, and the chroma (C*) of a mixture (white light) of the red, green, and blue light beams on the color system is decreased.

The area of the color gamut on the a*b* plane on the color system is preferably 750 or more. The chroma (C*) (the distance from the C light source defined by a*=0 and b*=0) of the color light mixture is preferably 1.5 or less.

The thicknesses and area ratios of the red, green, and blue filters 15R, 15G, and 15B will be described in detail. In this embodiment, the thicknesses of the respective color filters are set as follows:

red filter thickness t(R)=0.9 to 1.2 μm green filter thickness t(G)=0.8 to 1.1 μm blue filter thickness t(B)=1.1 to 1.4 μm The area ratios of the respective color filters are set as follows:

red filter area ratio s(R)=90 to 95% green filter area ratio s(G)=60 to 65% blue filter area ratio s(B)=75 to 80%

Figure 10A:
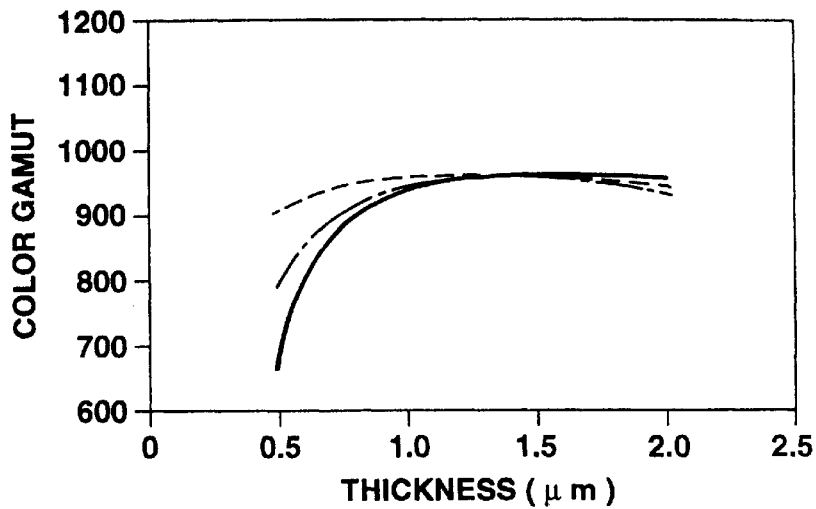
FIGS. 10A to 10C are graphs respectively showing the relationships between the thickness of each color filter and the color gamut, the chroma, and the lightness in the liquid crystal display device of the first embodiment.
Figure 10B:
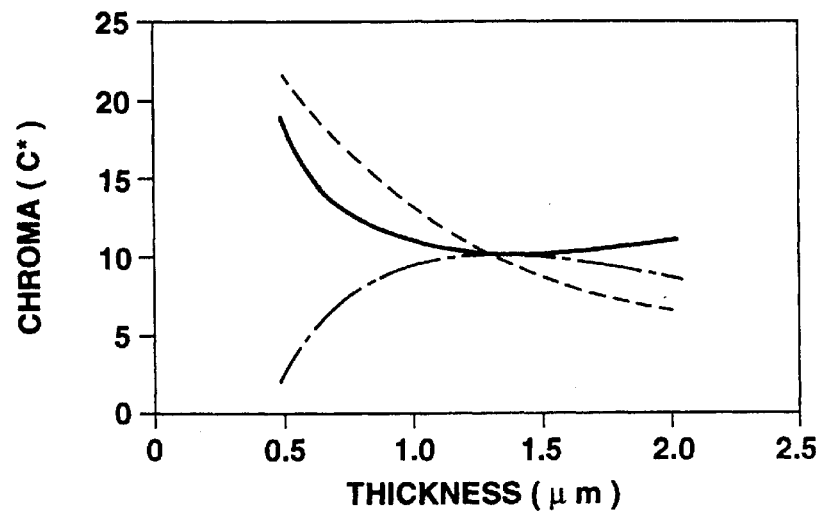
Figure 10C:
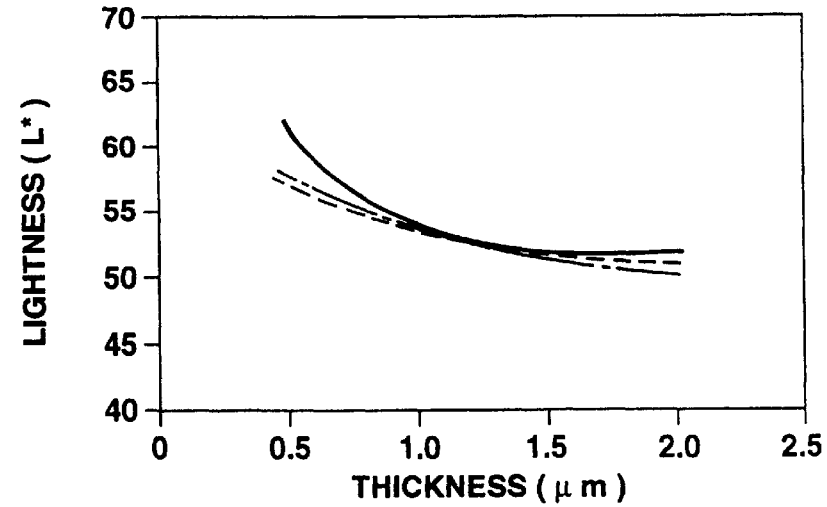

FIGS. 10A to 10C respectively show changes in color gamuts and the chromas (C*) and lightnesses (L*) of color light mixtures on the CIE 1976 L*a*b L*a*b color system with changes in the thicknesses t(R), t(G), and t(B) of the color filters 15R, 15G, and 15B of the liquid crystal display device. The characteristics in FIGS. 10A to 10C are obtained when each of the area ratios s(R), s(G), and s(B) of the respective color filters is set to 80% of the pixel area A.

FIG. 10A shows the change characteristics of the above color gamut with respect to the thickness of each color filter. Referring to FIG. 10A, the solid line indicates characteristics obtained when the thicknesses t(G) and t(B) of the two color filters 15G and 15B of green and blue are fixed to 1.5 μm, and only the thickness t(R) of the red filter 15R is changed, the chain line indicates characteristics obtained when the thicknesses t(R) and t(B) of the two color filters 15R and 15B of red and blue are fixed to 1.5 μm, and only the thickness t(G) of the green filter 15G is changed, and the dashed line indicates characteristics obtained when the thicknesses t(R) and t(G) of the two color filters 15R and 15G of red and green are fixed to 1.5 μm, and only the thickness t(B) of the blue filter 15B is changed.

As shown in FIG. 10A, as the thicknesses of the red filter (solid line) and the green filter (chain line) decrease, the color gamut abruptly decreases, whereas the color gamut changes little as the thickness of the blue filter (dashed line) changes. The color gamut always exhibits the maximum value at some thickness in the thickness range of each color filter.

FIG. 10B shows the change characteristics of the chroma (C*) of a color light mixture with respect to the thickness of each color filter. Referring to FIG. 10B, the solid line indicates characteristics obtained when the thicknesses t(G) and t(B) of the two color filters 15G and 15B of green and blue are fixed to 1.5 μm, and only the thickness t(R) of the red filter 15R is changed, the chain line indicates characteristics obtained when the thicknesses t(R) and t(B) of the two color filters 15R and 15B of red and blue are fixed to 1.5 μm, and only the thickness t(G) of the green filter 15G is changed, and the dashed line indicates characteristics obtained when the thicknesses t(R) and t(G) of the two color filters 15R and 15G of red and green are fixed to 1.5 μm, and only the thickness t(B) of the blue filter 15B is changed.

As shown in FIG. 10B, as the thickness of the green filter (chain line) decreases, the chroma (C*) decreases. As a result, the color balance improves.

As the thicknesses of the red filter (solid line) and the blue filter (dashed line) decrease, the chroma (C*) increases. As these thicknesses increase, the chroma (C*) decreases. As a result, the color balance improves.

FIG. 10C shows the change characteristics of the lightness (L*) of a color light mixture with respect to the thickness of each color filter. Referring to FIG. 10C, the solid line indicates characteristics obtained when the thicknesses t(G) and t(B) of the two color filters 15G and 15B of green and blue are fixed to 1.5 μm, and only the thickness t(R) of the red filter 15R is changed, the chain line indicates characteristics obtained when the thicknesses t(R) and t(B) of the two color filters 15R and 15B of red and blue are fixed to 1.5 μm, and only the thickness t(G) of the green filter 15G is changed, and the dashed line indicates characteristics obtained when the thicknesses t(R) and t(G) of the two color filters 15R and 15G of red and green are fixed to 1.5 μm, and only the thickness t(B) of the blue filter 15B is changed.

As shown in FIG. 10C, as the thickness of each color filter decreases, the lightness (L*) increases. This tendency is especially noticeable when the thickness of the red filter (solid line) decreases.

In the liquid crystal display device of this embodiment, therefore, the thicknesses of the respective color filters are set within the range in which the above color gamut takes on the maximum value on the basis of the graph of FIG. 10A.

In addition, the thickness t(G) of the green filter is set to the minimum value, the thickness t(B) of the blue filter is set to the maximum value, and the thickness t(R) of the red filter is set to the intermediate value on the basis of the graph of FIG. 10B.

Furthermore, the thicknesses of the respective filters are minimized within the range in which the color gamut takes on the maximum value on the basis of the graph of FIG. 10C.

Figure 11A:
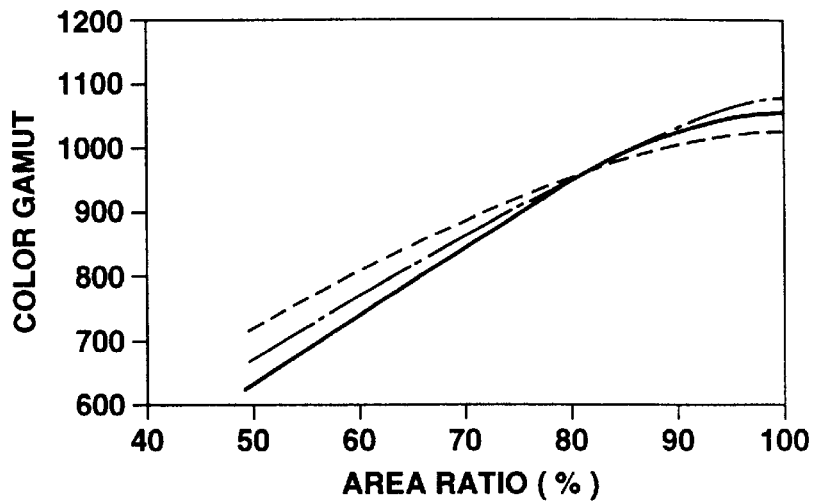
FIGS. 11A to 11C are graphs respectively showing the relationships between the area ratio of each color filter and the color gamut, the chroma, and the lightness in the liquid crystal display device of the first embodiment.
Figure 11B:
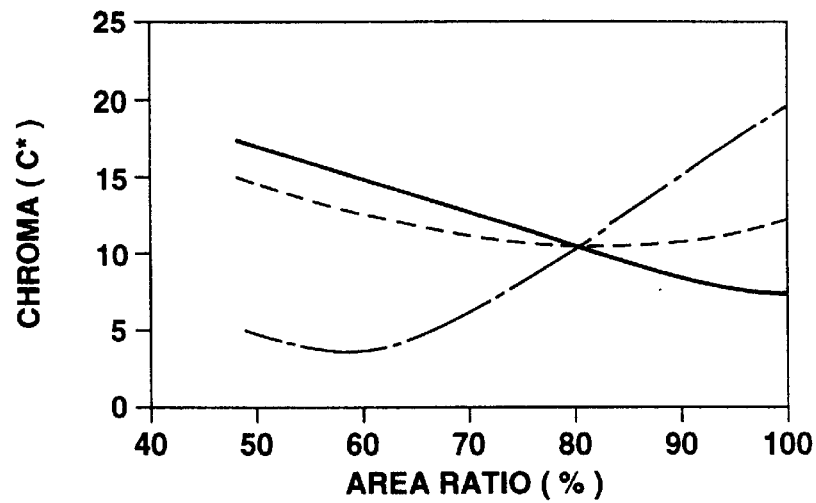
Figure 11C:
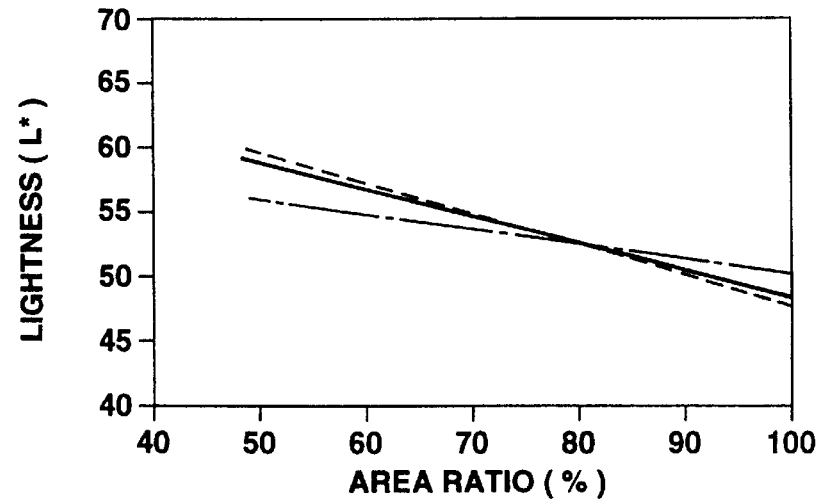

FIGS. 11A to 11C show changes in the color gamut on the above color system and the chroma (C*) and lightness (L*) of a color light mixture with changes in the area ratios s(R), s(G), and s(B) of the respective color filters of the liquid crystal display device described above. The characteristics in FIGS. 11A to 11C are obtained when each of the thicknesses t(R), t(G), and t(B) of the respective color filters 15R, 15G, and 15B is set to 1.5 μm.

FIG. 11A shows the change characteristics of the color gamut with respect to the filter area ratio. Referring to FIG.

11A, the solid line indicates characteristics obtained when the area ratios s(G) and s(B) of the two color filters 15G and 15B of green and blue are fixed to 80%, and only the area ratio s(R) of the red filter 15R is changed, the chain line indicates characteristics obtained when the area ratios s(R) and s(B) of the two color filters 15R and 15B of red and blue are fixed to 80%, and only the area ratio s(G) of the green filter 15G is changed, and the dashed line indicates characteristics obtained when the area ratios s(R) and s(G) of the two color filters 15R and 15G of red and green are fixed to 80%, and only the area ratio s(B) of the blue filter 15B is changed.

As shown in FIG. 11A, the color gamut increases as the area ratio of each color filter increases.

FIG. 11B shows the change characteristics of the chroma (C*) of a color light mixture with respect to the filter area ratio. Referring to FIG. 11B, the solid line indicates characteristics obtained when the area ratios s(G) and s(B) of the two color filters 15G and 15B of green and blue are fixed to 80%, and only the area ratio s(R) of the red filter 15R is changed, the chain line indicates characteristics obtained when the area ratios s(R) and s(B) of the two color filters 15R and 15B of red and blue are fixed to 80%, and only the area ratio s(G) of the green filter 15G is changed, and the dashed line indicates characteristics obtained when the area ratios s(R) and s(G) of the two color filters 15R and 15G of red and green are fixed to 80%, and only the area ratio s(B) of the blue filter 15B is changed.

As shown in FIG. 11B, when the area ratio of the green filter (chain line) is near 60%, the chroma (C*) of the color light mixture is minimized. In addition, the area ratio of the blue filter (dashed line) at which the chroma (C*) of the color light mixture is minimized is larger than the area ratio of the green filter (chain line) at which the chroma (C*) of the color light mixture is minimized. Furthermore, the area ratio of the red filter (solid line) at which the chroma (C*) of the color light mixture is minimized is larger than the area ratio of the blue filter (dashed line) at which the chroma (C*) of the color light mixture is minimized.

FIG. 11C shows the change characteristics of the lightness (L*) of a color light mixture with respect to the filter area ratio. Referring to FIG. 11C, the solid line indicates characteristics obtained when the area ratios s(G) and s(B) of the two color filters 15G and 15B of green and blue are fixed to 80%, and only the area ratio s(R) of the red filter 15R is changed, the chain line indicates characteristics obtained when the area ratios s(R) and s(B) of the two color filters 15R and 15B of red and blue are fixed to 80%, and only the area ratio s(G) of the green filter 15G is changed, and the dashed line indicates characteristics obtained when the area ratios s(R) and s(G) of the two color filters 15R and 15G of red and green are fixed to 80%, and only the area ratio s(B) of the blue filter 15B is changed.

As shown in FIG. 11C, as the area ratio of each color filter decreases, the lightness (L*) of the color light mixture increases.

In the liquid crystal display device of this embodiment, therefore, the area ratios of the respective color filters are set to increase in the order of the green, blue, and red filters on the basis of the graph of FIG. 11B. In addition, the area ratios of the respective filters are set on the basis of the graphs of FIGS. 11A and 11C such that both the color gamut and the lightness (L*) of the color light mixture do not decrease.

The color gamuts, the chromas (C*) and lightnesses (L*) of the color light mixture components in FIGS. 10A to 10C and 11A to 11C are values associated with mixtures of red, green, and blue light components emerging from the colored light exit areas of the respective pixel areas A, non-colored light components emerging from the non-colored light exit areas b, and non-colored light components emerging from the areas between the respective pixel areas.

FIGS. 12A to 12C and 13A to 13C show the color gamuts, the chromas (C*) and lightnesses (L*) of color light mixtures on the CIE 1976 L*a*b L*a*b color system which are obtained when the thicknesses t(R), t(G), and t(B) and area ratios s(R), s(G), and s(B) of the respective color filters 15R, 15G, and 15B are set to various values in the above manner.

Figure 12A:
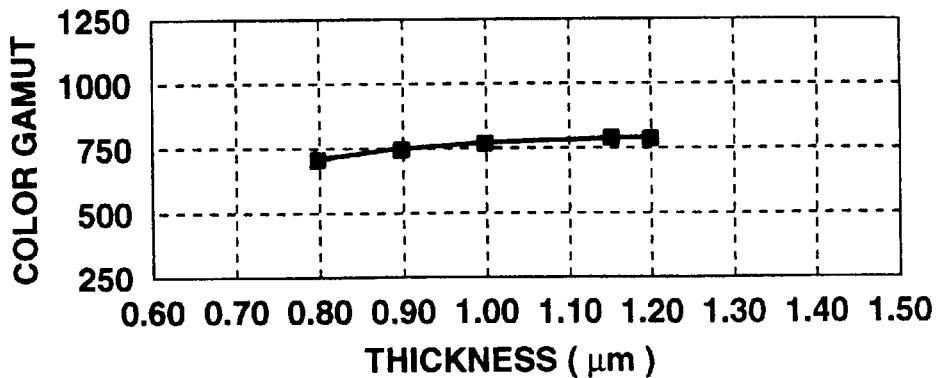
FIGS. 12A to 12C are graphs respectively showing the relationships between the thickness of each color filter and the color gamut, the chroma, and the lightness in the liquid crystal display device of the first embodiment.
Figure 12B:
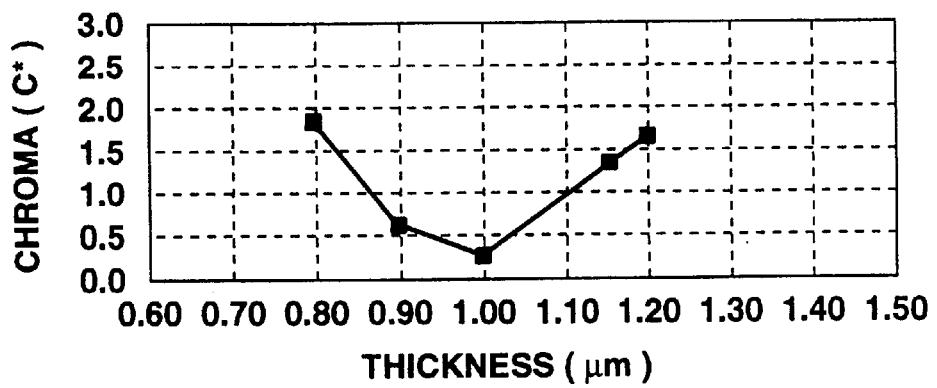
Figure 12C:
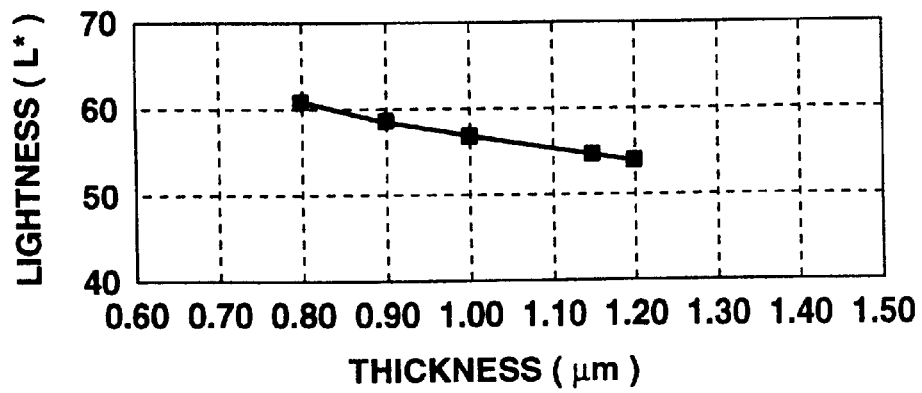

FIGS. 12A to 12C show the characteristics obtained when the area ratios s(R), s(G), and s(B) of the red, green, and blue filters 15A, 15B, and 15C are fixed as s(R)=90%, s(G)=60%, and s(B)=75%, and the thicknesses t(R), t(G), and t(B) of the color filters 15R, 15G, and 15B are changed while the differences between their thicknesses are kept as follows:

green filter thickness t(G)=t(R)−0.10 μm
blue filter thickness t(B)=t(R)+0.20 μm The thickness t(R) of the red filter is plotted as a representative value along the abscissa of each graph.

FIG. 12A shows the change characteristics of the color gamut. FIG. 12B shows the change characteristics of the chroma (C*) of a color light mixture. FIG. 12C shows the change characteristics of the lightness (L*) of a color light mixture.

As shown in FIG. 12A, when the thickness of the red filter is less than 0.9 μm, the color gamut becomes smaller than 750 that is required to display an enough number of colors to provide a full-color display. When the thickness falls within the range of 0.9 μm (inclusive) to 1.2 μm (inclusive), the color gamut exceeds a color gamut of 750.

As shown in FIG. 12B, when the thickness of the red filter falls within the range of 0.9 μm (inclusive) to about 1.2 μm (inclusive), the chroma (C*) of the color light mixture (white light) becomes equal to or smaller than 1.5 that is required to provide a white display with substantially no color light.

As shown in FIG. 12C, when the thickness of the red filter falls within the range of 0.9 μm (inclusive) to 1.2 μm (inclusive), the lightness (L*) of the color light mixture (white light) becomes equal to or larger than 52 that is required to provide a sufficiently bright display.

Figure 13A:
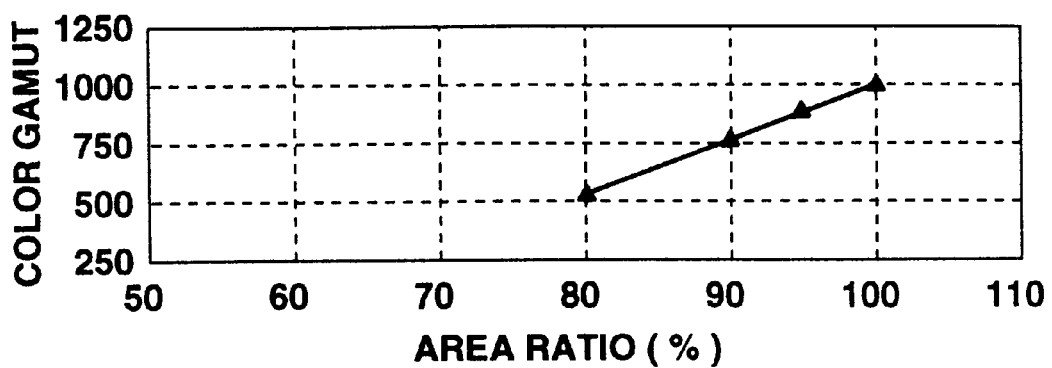
FIGS. 13A to 13C are graphs respectively showing the relationships between the thickness of each color filter and the color gamut, the chroma, and the lightness in the liquid crystal display device of the first embodiment.
Figure 13B:
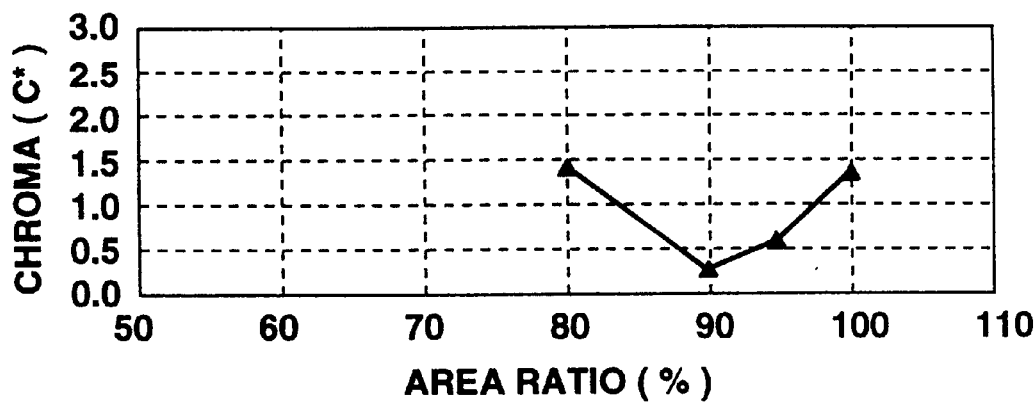
Figure 13C:
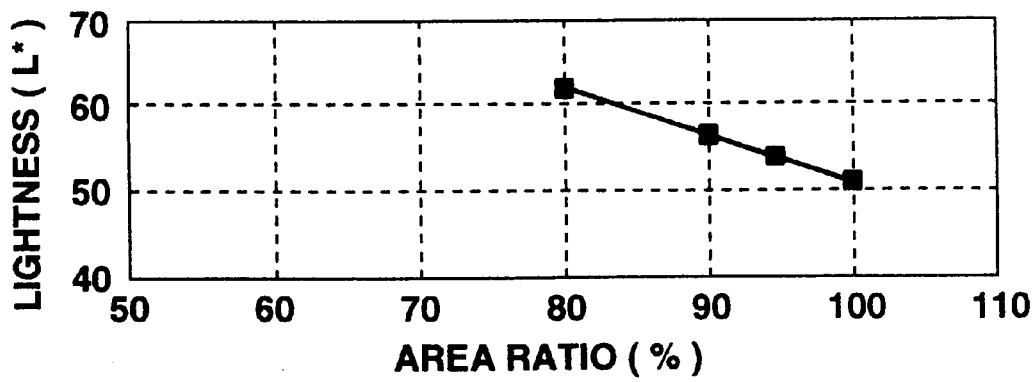

FIGS. 13A to 13C show the characteristics obtained when the thicknesses t(R), t(G), and t(B) of the color filters 15R, 15G, and 15B are fixed as t(R)=1.0 μm, t(G)=0.9 μm, and t(B)=1.2 μm, and the area ratios s(R), s(G), and s(B) of the color filters 15R, 15G, and 15B are changed while predetermined differences are kept between the area ratios of the respective color filters as follows:

green filter area ratio s(G)=s(R)−30%
blue filter area ratio s(B)=s(R)−15%

The area ratio s(R) of the red filter is plotted as a representative value along the abscissa of each graph.

FIG. 13A shows the change characteristics of the color gamut. FIG. 13 B shows the change characteristics of the chroma (C*) of a color light mixture. FIG. 13C shows the change characteristics of the lightness (L*) of the color light mixture.

As shown in FIG. 13A, when the area ratio of the red filter is less than 90%, the color gamut of the respective display colors becomes smaller than 750 that is required to display an enough number of colors to provide a full-color display. When the area ratio of the red filter is 90% or more, the above color gamut exceeds 750.

As shown in FIG. 13B, when the area ratio of the red filter falls within the range of 80% (inclusive) to 100% (inclusive), the chroma (C*) of the color light mixture (white light) becomes equal to or smaller than 1.5 that is required to provide a white display with substantially no color light.

As shown in FIG. 13C, when the area ratio of the red filter is 80% or more, the lightness (L*) of the color light mixture (white light) exceeds 52 that is required to provide a sufficiently bright display.

Note that the color gamuts, the chromas (C*) and lightnesses (L*) of the color light mixture components shown in FIGS. 12A to 12C and 13A to 13C are values associated with mixtures of red, green, and blue light components emerging from the colored light exit areas a of the respective pixel areas A, non-colored light components emerging from the non-colored light exit areas b, and non-colored light components emerging from the bright display areas W between the adjacent pixel areas.

According to the color gamut, the chroma (C*) and lightness (L*) of the color light mixture which are set to the values shown in FIGS. 12A to 12C and 13A to 13C, the color gamut on the a*b* plane on the CIE 1976 L*a*b L*a*b color system is nearly maximized, the chroma (C*) of a mixture of red, green, and blue light components is nearly minimized, and the lightness (L*) of the color light mixture becomes a sufficiently large value, when the filter thicknesses and the filter area ratios (with respect to the area of the pixel area A) are set as follows:

red filter thickness t(R)=0.9 to 1.2 $\mu$m green filter thickness t(G)=0.8 to 1.1 $\mu$m blue filter thickness t(B)=1.1 to 1.4 $\mu$m red filter area ratio s(R)=90 to 95% green filter area ratio s(G)=60 to 65% blue filter area ratio s(B)=75 to 80%

By setting the thicknesses t(R), t(G), and t(B) and area ratios s(R), s(G), and s(B) of the red, green, and blue filters 15R, 15G, and 15B to values in the above ranges, the area of the color gamut can be set to be equal to or more than 750 that is required to display an enough number of colors to provide a full-color display, and the chroma (C*) of the color light mixture can be set to be equal to or smaller than 1.5 that is required to provide a white display with substantially no colored light. In addition, the lightness (L*) of the color light mixture can be set to be equal to or larger than about 52 that is required to provide a sufficiently bright display.

That is, in the above liquid crystal display device, the area of the color gamut surrounded by a. triangle connecting the color coordinates RC of red light, the color coordinates GC of green light, and the color coordinates BC of blue light on the CIE 1976 L*a*b L*a*b color system in FIG. 9 is essentially maximized (750 or more), and the chroma (C*) of the color light mixture becomes very close to the value (C*=1.5 or less) of the C light source with a*=0 and b*=0.

According to the above liquid crystal display device, the light transmittance can be increased to obtain a sufficiently bright screen without decreasing the chroma (C*) of each of red, green, and blue light beams and degrading the color balance. A high-quality full-color image can therefore be displayed.

According to the first embodiment, the aligning directions of the liquid crystal molecules, of the liquid crystal layer, which are located near the substrates 1 and 2 are regulated by the aligning film 14 on the rear-side substrate 2 and the aligning film 19 on the front-side substrate 1 such that the liquid crystal molecules are twisted between the two substrates 1 and 2 at a predetermined twist angle (e.g., about 90°).

Each of the color filters 15R, 15G, and 15B arranged to oppose the pixel electrodes 3 on the rear-side substrate 2 has an area smaller than that of the pixel area A. That is, only the filter areas a of the respective pixel areas A which correspond to the color filters 15R, 15G, and 15B serve as colored light exit areas, and the non-filter areas b, other than the filter areas a, which do not correspond to the color filters 15R, 15G, and 15B serve as non-colored light exit areas b through which light incident on the liquid crystal display device from the front side of the device, reflected by the reflecting member 23 on the rear side, and emerging from the front side of the liquid crystal display device is transmitted without being colored. In this embodiment, each of the color filters 15R, 15G, and 15B is formed to have an area about 70% of the pixel area A, and corresponds to the inner area of the pixel area A except for its peripheral portion. The entire peripheral portion of each pixel area A therefore serves as the non-filter area b.

The inter-pixel areas between the respective adjacent pixel areas A serve as the bright display areas W through which incident light is always reflected by the reflecting member 23, the gate line 10, the data line 11, and the like to emerge toward the front side of the device.

In this liquid crystal display device, since each of the color filters 15R, 15G, and 15B is formed to have an area smaller than that of the pixel area A, the thicknesses of portions of the liquid crystal LC within each pixel area A differ from each other at the filter area a, which corresponds to the color filter, and the non-filter area b, which does not correspond to the color filter, by the thickness of each of the color filters 15R, 15G, and 15B.

In this liquid crystal LC, a product $\Delta$nd1 of a thickness d1 of a liquid crystal layer in the filter area a of the above pixel area and a refractive index anisotropy $\Delta$n of the liquid crystal layer and a product $\Delta$nd2 of a thickness d2 of a liquid crystal layer in the non-filter area b and a refractive index anisotropy $\Delta$n of the liquid crystal layer are set such that the spectral transmittance distribution in the visible range which is obtained by synthesizing the spectral transmittance distribution of a liquid crystal element having the liquid crystal LC with the product $\Delta$nd1 and the spectral transmittance distribution of a liquid crystal element having the liquid crystal LC with the product $\Delta$nd2 becomes substantially flat.

The liquid crystal layer thickness d1 in the filter area a of each pixel area A, the liquid crystal layer thickness d2 in the non-filter area b, and the refractive index anisotropy $\Delta$n of the liquid crystal are set such that the product $\Delta$nd1 of the refractive index anisotropy $\Delta$n and the thickness d1 of the liquid crystal layer in the filter area a is smaller than a product $\Delta$nd0 with which a normally white mode TN liquid crystal display device exhibits a maximum transmittance (the ratio of the intensity of exit light to the intensity of incident light) with respect to light having a specific wavelength in the visible range, and the product $\Delta$nd2 of the refractive index anisotropy $\Delta$n and the thickness d2 of the liquid crystal layer in the non-filter area b is larger than the product $\Delta$nd0.

In this embodiment, therefore, when a product $\Delta$nd of the liquid crystal layer which corresponds to the maximum transmittance (the ratio of the intensity of exit light to the intensity of incident light) is defined as the product $\Delta$nd0, the product $\Delta$nd1 in the filter area a and the product $\Delta$nd2 in the non-filter area b are set to satisfy $\Delta$nd1<$\Delta$nd0<$\Delta$nd2. With this setting, the synthetic spectral transmission distribution obtained by synthesizing the spectral transmittance distribution of the filter area a, which is obtained when each of the color filters 15R, 15G, and 15B is replaced with a colorless filter, and the spectral transmittance distribution of the non-filter area b becomes substantially flat in the visible range.

Note that as the product $\Delta$nd of the liquid crystal layer greatly changes, the transmittance greatly decreases, and the spectral transmittance characteristics greatly change. For this reason, the product $\Delta nd1$ of the filter area a and the product $\Delta nd2$ of the non-filter area b preferably fall within the range of $\Delta nd0$ to $\pm\frac{1}{2}$ ($\Delta nd0$).

In the above liquid crystal display device, when the product $\Delta nd$ of the liquid crystal layer which corresponds to the maximum transmittance is defined as the product $\Delta nd0$, the product $\Delta nd1$ of the filter area a of each pixel area A and the product $\Delta nd2$ of the non-filter area b are set to satisfy $\Delta nd1 < \Delta nd0 < \Delta nd2$. With this setting, when a liquid crystal having the product $\Delta nd1$ and a liquid crystal having the product $\Delta nd2$ are used for a liquid crystal element including a liquid crystal layer having a uniform thickness and sandwiched between a pair of polarizing plates, a spectral transmittance distribution obtained by synthesizing spectral transmittance distributions for light transmitted through the respective liquid crystal elements exhibits substantially flat characteristics with respect to light in the visible range. That is, since the spectral transmittance distribution obtained by synthesizing both the spectral transmittance distribution of the filter area a, which is obtained when each of the color filters 15R, 15G, and 15B is replaced with a colorless filter, and the spectral transmittance distribution of the non-filter area b is made substantially flat in the visible range, a color image displayed with colored light emerging from the filter area a and non-colored light emerging from the non-filter area b becomes a full color image with good color balance.

In a TN liquid crystal display device, since the birefringence characteristics of the liquid crystal layer are wavelength-dependent, linearly polarized light transmitted through the incident-side polarizing plate and incident on the liquid crystal is subjected to optical rotary dispersion, and light components having different wavelengths receive different optical rotary powers. For this reason, when light is transmitted through the liquid crystal layer, the planes of vibrations of light components having different wavelengths in the visible range slightly shift from each other. As a result, the spectral intensity distribution of the light transmitted through the exit-side polarizing plate becomes uneven, and the exit light is slightly colored.

The degree of coloring of this exit light is dependent on the product $\Delta nd$ of the liquid crystal layer.

In the above liquid crystal display device, since the area of each of the respective color filters 15R, 15G, and 15B is set to be smaller than that of the pixel area A, the color filters 15R, 15G, and 15B are present in the filter areas a, of the pixel areas A, to which the color filters 15R, 15G, and 15B correspond, but none of the color filters 15R, 15G, and 15B are present in the non-filter areas b. For this reason, the liquid crystal layer thickness in the filter area a is smaller than that in the non-filter area b by the thickness of the color filter. The product $\Delta nd1$ of the liquid crystal in the filter area a therefore differs from the product $\Delta nd2$ of the liquid crystal layer in the non-filter area b. For this reason, light transmitted through the filter area a and light transmitted through the non-filter area b have different spectral transmittance distributions, and light beams colored with different colors emerge from the respective areas.

Figure 14:
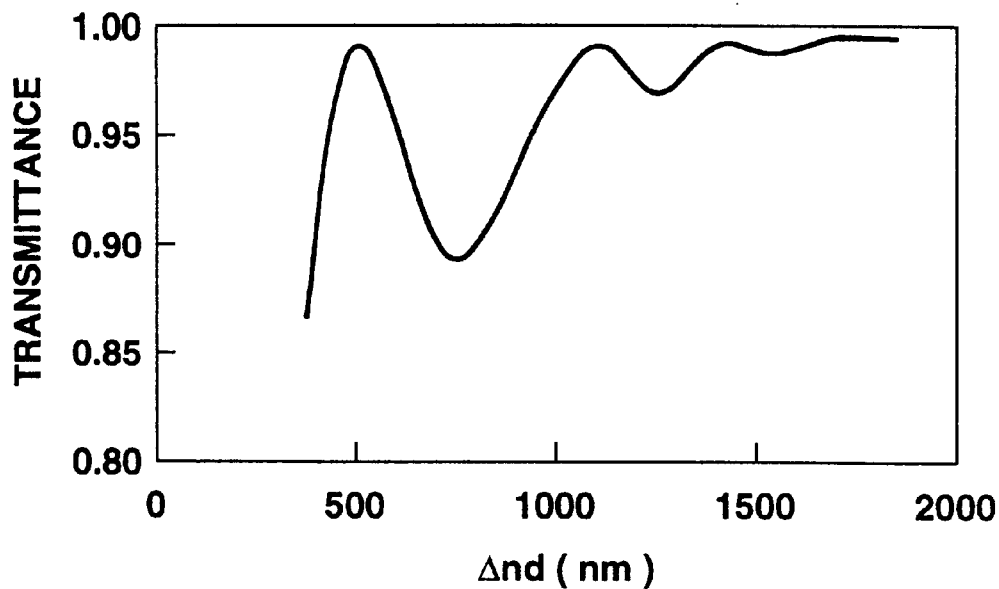
FIG. 14 is a graph showing the relationship between the product Δnd and the transmittance of the liquid crystal display device according to the first embodiment.
Figure 15:
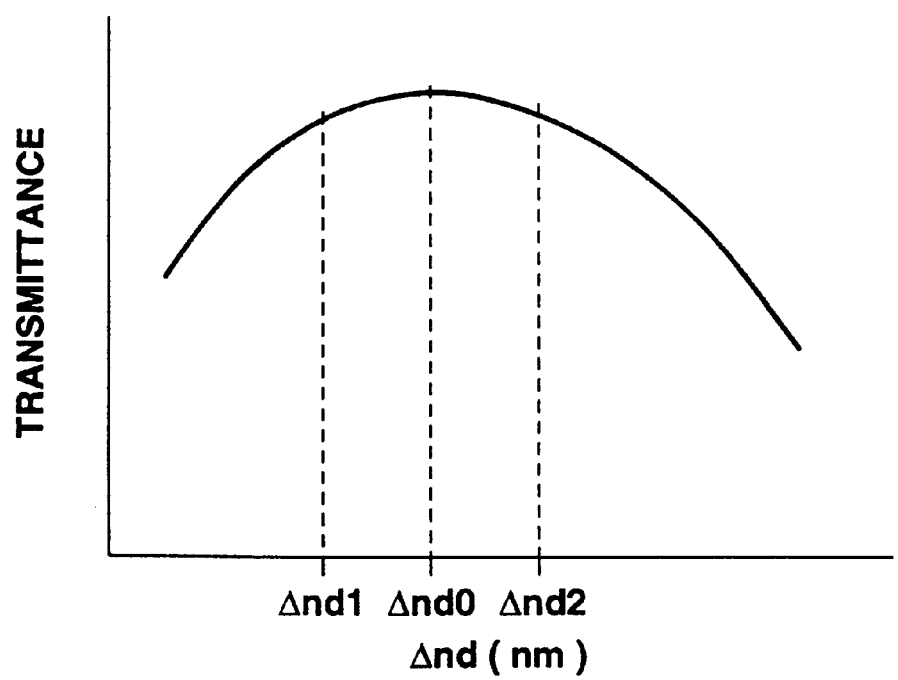
FIG. 15 is an enlarged view of part of FIG. 14.

FIG. 14 shows changes in transmittance ($\Delta nd$-transmittance characteristics) with changes in the product $\Delta nd$ in the absence of an applied electric field in a normally white mode TN liquid crystal display device including a liquid crystal layer having a uniform thickness and sandwiched between a pair of polarizing plates and no color filters. FIG. 15 is an enlarged view of a portion near the first peak of the $\Delta nd$-transmittance characteristics in FIG. 14. Referring to FIGS. 14 and 15, the transmittance on the ordinate is the ratio of the intensity of exit light and the intensity of incident light.

As shown in FIGS. 14 and 15, the transmittance of the liquid crystal display device changes to have a plurality of maximum values as the product $\Delta nd$ changes. When the liquid crystal layer has a product $\Delta nd$ corresponding to the maximum transmittance, the contrast is maximized.

In the liquid crystal display device of this embodiment, as shown in FIG. 15, the product $\Delta nd$ with which the maximum contrast is obtained is defined as $\Delta nd0$, and the product $\Delta nd1$ of the filter area a and the product $\Delta nd2$ of the non-filter area b are set such that an almost intermediate value between these values is equal to the optimal product $\Delta nd0$. If, for example, the optimal product $\Delta nd0$ is 527 to 528 nm, the product $\Delta nd1$ of the filter area a is about 432 nm, and the product $\Delta nd2$ of the non-filter area b is about 558 nm.

Figure 16:
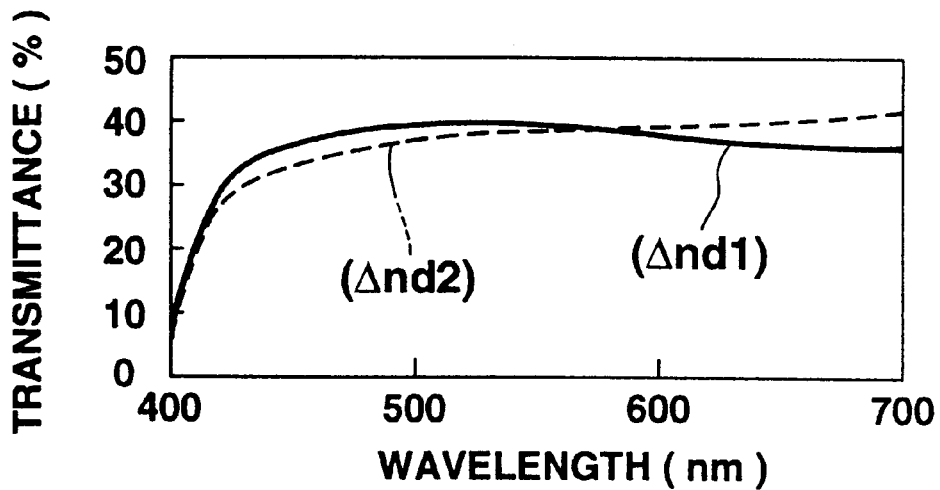
FIG. 16 is a graph showing the spectral transmittance distributions of light components transmitted through filter and non-filter areas in the liquid crystal display device according to the first embodiment.

FIG. 16 shows the spectral transmittance distribution of only the liquid crystal layer which is obtained in the liquid crystal display device of this embodiment when the influences of the absorption wavelength ranges of the color filters 15R, 15G, and 15B are eliminated. More specifically, FIG. 16 shows the spectral transmittance distributions of the filter area a and the non-filter area b which are obtained when the color filters 15R, 15G, and 15B used in the liquid crystal display device of this embodiment are replaced with colorless filters having no absorption wavelength ranges, and the products $\Delta nd1$ and $\Delta nd2$ are set with respect to the product $\Delta nd0$ (527 to 528 nm) to satisfy $\Delta nd1 < \Delta nd0 < \Delta nd2$. The above products $\Delta nd1$ and $\Delta nd2$ are respectively set as $\Delta nd1 = 432$ nm and $\Delta nd2 = 558$ nm, and the liquid crystal layer thickness d1 in the filter area a, the liquid crystal layer thickness d2 in the non-filter area b, and the refractive index anisotropy $\Delta n$ of the liquid crystal are respectively set as d1=4.8 $\mu$m, d2=6.2 $\mu$m, and $\Delta n=0.09$. In addition, the area ratio of the filter area a is set to 70% of the area of the pixel area A.

As shown in FIG. 16, when the products $\Delta nd1$ and $\Delta nd2$ of the filter area a and the non-filter area b are set with respect to the optimal product $\Delta nd0$ to satisfy $\Delta nd1 < \Delta nd0 < \Delta nd2$, the wavelength range, in the spectral transmittance distribution of the filter area a having the product $\Delta nd1$ smaller than the product $\Delta nd0$, in which a peak appears differs from the wavelength range, in the spectral transmittance distribution of the non-filter area b having the product $\Delta nd1$ larger than the product $\Delta nd0$, in which a peak appears. In the spectral transmittance distribution of the filter area a, a peak appears in the short wavelength range in the visible range, and the transmittance decreases in the long wavelength range. In the spectral transmittance distribution of the non-filter area b, a peak appears in the long wavelength range in the visible wavelength range, and the transmittance decreases in the short wavelength range.

Since these two spectral transmittance distributions are observed combined in one pixel area A, the two spectral transmittance distributions compensate each other, so that a flat spectral transmittance distribution is obtained in the visible range. As a result, no transmitted light is colored by the liquid crystal layer, and hence a display device having high chromatic purity can be obtained.

Figure 17:
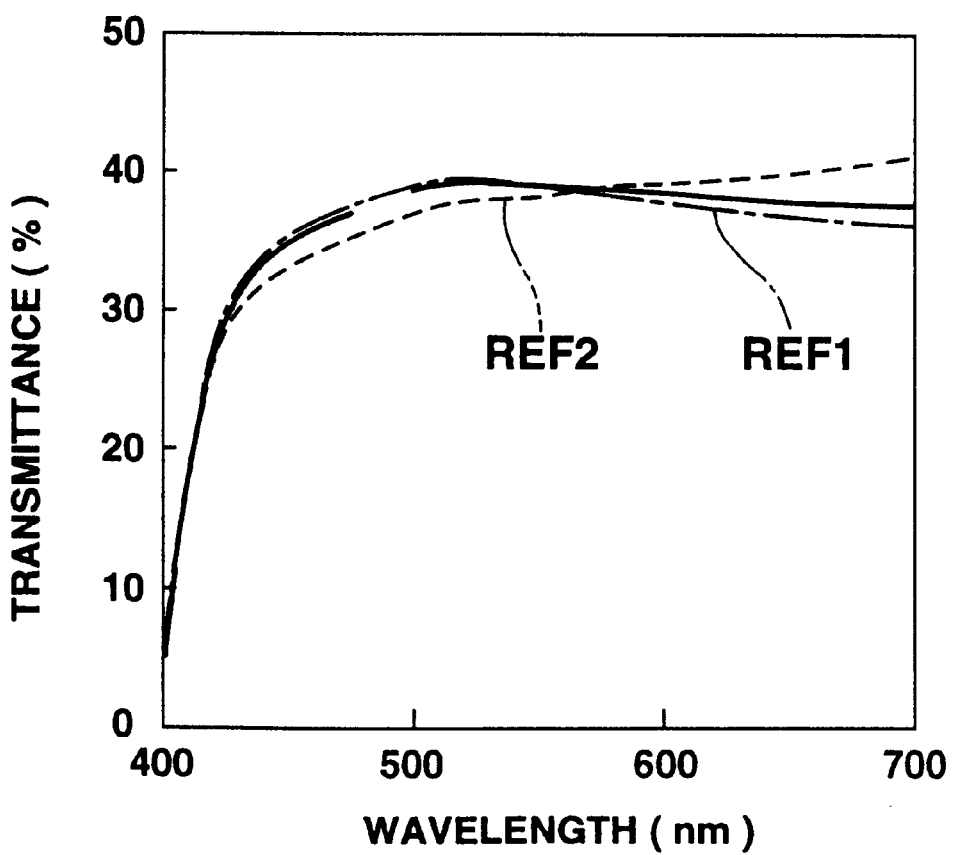
FIG. 17 is a graph showing the spectral transmittance distribution of the liquid crystal display device according to the first embodiment.

Referring to FIG. 17, the solid line indicates the synthetic spectral transmittance distribution obtained by synthesizing two spectral transmittance distributions of the filter area a and the non-filter area b of the above liquid crystal display device. FIG. 17 also shows Comparative Examples 1 (REF. 1) and 2 (REF. 2).

The products $\Delta nd1$ and $\Delta nd2$ of Comparative Example 1 are respectively set as $\Delta nd1=528$ nm (roughly equal to the product Δnd0) and Δnd2=682 nm, and the refractive index anisotropy Δn of the liquid crystal is set as Δn=0.11. The products Δnd1 and Δnd2 of Comparative Example 2 are respectively set as Δnd2=527 nm (almost equal to the product Δnd0) and Δnd1=408 nm, and the refractive index anisotropy Δn of the liquid crystal is set as Δn=0.085. In Comparative Examples 1 and 2, the liquid crystal layer thicknesses d1 and d2 and the ratio of the filter area a to the pixel area are respectively set as d1=4.8 μm, d2=6.2 μm, and 70%.

As indicated by the solid line in FIG. 17, the synthetic spectral transmittance distribution of the liquid crystal display device of this embodiment is almost flat throughout the visible range, and hence transmitted light is scarcely colored. In contrast to this, according to the synthetic spectral transmittance distribution of Comparative Example 1, as indicated by the chain line, the transmittance with respect to light in the wavelength range of about 500 to 600 nm is high, and the transmittances on the short and long wavelength sides are low. For this reason, transmitted light is slightly colored with green.

According to the synthetic spectral transmittance distribution of Comparative Example 2, as indicated by the dashed line, the transmittance on the short wavelength side is low, and the transmittance on the long wavelength side is high. For this reason, the transmitted light is slightly colored with yellow.

Even if the red, green, and blue filters 15R, 15G, and 15B are arranged as in the liquid crystal display device of this embodiment, and the optical effects of these color filters are taken into consideration, since light components transmitted through the filter area a and the non-filter area b of each pixel area A are synthesized into white light, colored light produced owing to the influences of the liquid crystal layer do not mix with colored light components produced by the respective color filters corresponding to the respective pixel areas A, and the chromatic purity of each pixel becomes high. A display device with clear colors can therefore be obtained.

The transmittance of the liquid crystal display device changes in accordance with the product Δnd in the absence of an applied electric field, as shown in FIG. 14. The light transmittance has a plurality of peaks as the product Δnd changes. In consideration of contrast and response characteristics, however, the product Δnd corresponding to the first or second peak of the transmittance which appears as the product Δnd increases is preferably selected as the above product Δnd0.

To prevent the liquid crystal layers in the filter area a and the non-filter area b from having different thicknesses, the uneven surface formed by the color filters 15R, 15G, and 15B formed on the inner surface of the front-side substrate 1 may be covered with the protective film 17 to be flattened, as shown in FIG. 2.

In addition, according to the first embodiment, an aligning treatment is performed for the pair of opposing substrates in the following manner. The aligning films 14 and 19, each made of polyimide or the like, are respectively formed on the inner surfaces of the front-side and rear-side substrates 1 and 2, i.e., the pixel electrodes 3 and the counter electrode 18, to cover the entire display area. The surfaces of these aligning films 14 and 19 are subjected to an aligning treatment such as rubbing in predetermined directions. The nematic liquid crystal layer LC is formed between the two substrates 1 and 2. The aligning directions of the liquid crystal molecules located near the respective substrates 1 and 2 are regulated by the aligning films 14 and 19 formed on the inner surfaces of the substrates 1 and 2 such that the liquid crystal molecules are twisted between the substrates 1 and 2 at a twist angle of about 90°.

The front-side and rear-side polarizing plates 21 and 22 are respectively formed on the front surface of the front-side substrate 1 and the rear surface of the rear-side substrate 2 such that their absorption axes are perpendicular to each other, thereby realizing a normally white display state, in which a bright display is obtained when the liquid crystal layer is twisted. The aligned state and the arrangement of the polarizing in plates will be described in detail below with reference to FIG. 18.

Figure 18:
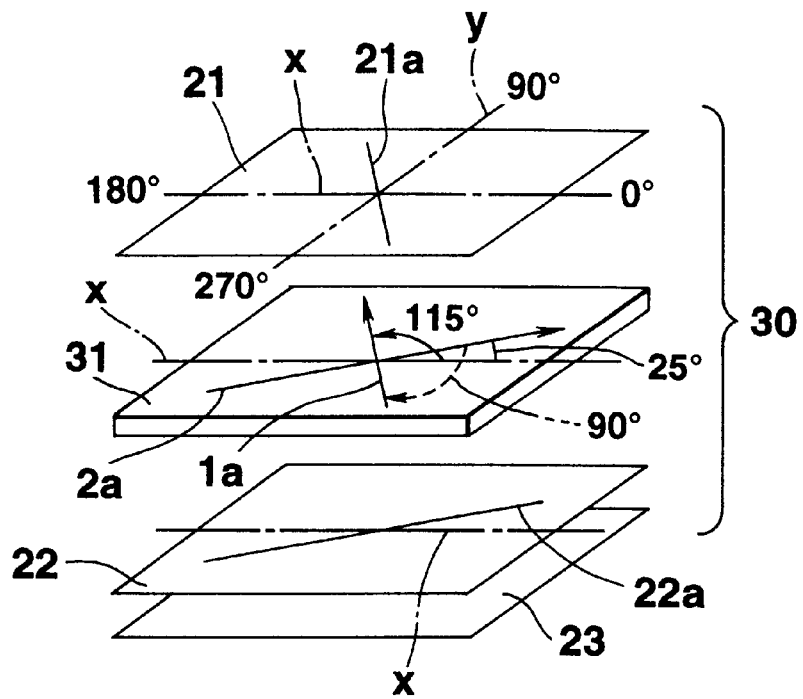
FIG. 18 is an exploded perspective view showing the schematic arrangement of the liquid crystal display device according to the first embodiment.

FIG. 18 is a perspective view showing the liquid crystal display device of this embodiment. Referring to FIG. 18, arrows 1a and 2a indicate the aligning directions of liquid crystal molecules near the two substrates 1 and 2. In a liquid crystal display device 30, the liquid crystal molecules, of a liquid crystal cell 31, which are located near the rear-side substrate 2 of the pair of substrates 1 and 2 are aligned within the angle range of 0° (exclusive) to 45° (exclusive) in the counterclockwise direction with respect the horizontal direction (abscissa x) when viewed from the substrate 1 side, and are also twisted, from the rear-side substrate 2 side to the front-side substrate 1, at a twist angle of almost 90° in the clockwise direction when viewed from the front side of the device.

The aligning direction 2a of the liquid crystal molecules near the rear-side substrate 2 is set in accordance with the incident angle of incident light (effective incident light), of light incident from the front surface of the liquid crystal display device 30, reflected by the reflecting member 23, and emerging from the display surface, which is reflected most strongly toward the observer side.

In this embodiment, when the incident angle (with respect to a direction perpendicular to the display surface) of light which is incident from the direction of the upper edge of the display surface and effective for observation is 30°, the aligning direction 2a of the liquid crystal molecules near the rear-side substrate 2 of the liquid crystal cell 31 is set to the following direction.

As shown in FIG. 18, the aligning direction 2a of the liquid crystal molecules near the rear-side substrate 2 of the liquid crystal cell 31 is shifted counterclockwise from the horizontal direction (abscissa x) by approximately 25° when viewed from the front-side substrate 1.

In this embodiment, in accordance with the aligning direction 2a of the liquid crystal molecules near the rear-side substrate 2, the aligning direction 1a of the liquid crystal molecules near the front-side substrate 1 of the liquid crystal cell 31 is set to a direction shifted counterclockwise from the aligning direction 2a by almost 90° when viewed from the front side of the device, i.e., a direction shifted counterclockwise from the abscissa x by almost 115° (25°+90°) when viewed from the front side of the device. The liquid crystal molecules are twisted, from the rear-side substrate 2 to the front-side substrate 1, at a twist angle of almost 90° in the clockwise direction when viewed from'the front side of the device.

In this embodiment, the reflecting member 23 is placed such that the incident direction in which a high reflectance in the vertical direction can be obtained is set to be almost parallel to a direction (ordinate y) perpendicular to the display surface of the liquid crystal display device 30. With this structure, incident light from the upper oblique side of the display surface, i.e., from the above incident direction of effective incident light, is efficiently reflected to emerge from the display surface.

In the above liquid crystal display device 30, the liquid crystal molecules, of the liquid crystal cell 31, which are located near the rear-side substrate 2 are aligned at almost 25° in the counterclockwise with respect to the abscissa x on the display surface when viewed from the front side of the device, and are also twisted, from the rear-side substrate 2 to the front-side substrate 1, at a twist angle of almost 90° in the clockwise direction with respect to the aligning direction 2a when viewed from the front side of the device. Even in the reflection type TN liquid crystal display device, therefore, a display observed from normal direction can be made sufficiently bright while satisfactory contrast is ensured.

The viewing angle of the liquid crystal display device 30 of the above embodiment is set in a direction shifted counterclockwise by about 70° when viewed from the front side of the device. This direction coincides with the lower oblique right side on the display surface when viewed from a direction perpendicular to the display surface. When the direction of the viewing angle is near this direction, the contrast of a display observed from normal direction, i.e., a direction slightly inclined to the lower edge of the display surface with respect to a direction perpendicular to the display surface, is not much lower than that in the conventional liquid crystal display device. That is, satisfactory contrast can be ensured.

It therefore suffices if the aligned state of the liquid crystal molecules of the liquid crystal cell 31 of the liquid crystal display device 30 is designed by setting the incident angle of effective incident light coming from the upper oblique side of the display surface to an arbitrary angle within the range of 20° to 30°.

Figure 19:
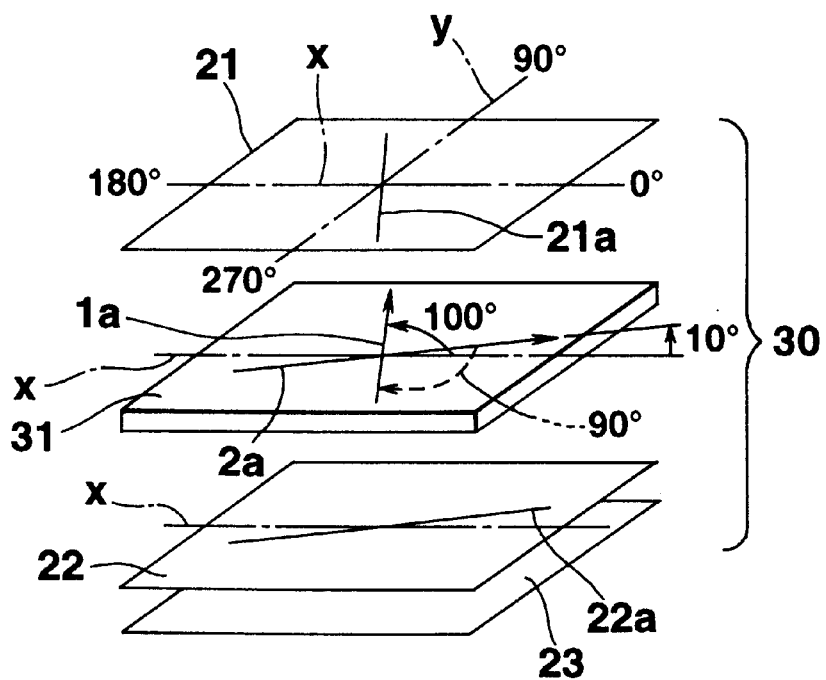
FIG. 19 is an exploded perspective view showing a modification of the aligned state of the liquid crystal display device according to the first embodiment.

FIG. 19 is a perspective view showing a modification of the aligned state. FIG. 19 shows a case in which the incident angle of effective incident light, of reflected light incident on the front surface of the front-side substrate 1 from the upper oblique side, is set to 20°. In the liquid crystal display device 30 of this embodiment in which the incident angle of effective incident light observed by the observer is set to 20°, the aligning direction 2a of the liquid crystal molecules near the rear-side substrate 2 is set as follows.

As shown in FIG. 19, the aligning direction 2a of the liquid crystal molecules near the rear-side substrate 2 of the liquid crystal cell 31 is shifted counterclockwise from the horizontal direction (abscissa x) by roughly 10° when viewed from the front side of the device.

In this embodiment, in accordance with the aligning direction 2a of the liquid crystal molecules near the rear-side substrate 2, the aligning direction 1a of the liquid crystal molecules near the front-side substrate 1 of the liquid crystal cell 31 is set to a direction shifted counterclockwise from the aligning direction 2a by approximately 90° when viewed from the front side of the device, i.e., a direction shifted counterclockwise from the horizontal direction (abscissa x) by about 100° (10°+90°) when viewed from the front side of the device, and the liquid crystal molecules are twisted, from the rear-side substrate 2 to the front-side substrate 1, at a twist angle of about 90° in the clockwise direction with respect to the aligning direction 2a of the liquid crystal molecules near the rear-side substrate 2 when viewed from the front side of the device.

In these embodiment and the modification, the incident angle of effective incident light, of reflected light incident from the upper oblique side of the display surface, which is observed by the observer is set to 20°. In most cases, effective incident light is incident obliquely within the angle range of about 20° to 30° toward the upper edge of the display surface with respect to a direction perpendicular to the display surface. It therefore suffices if the incident angle of effective incident light is arbitrarily set within the range in which this aligned state of this embodiment is maintained.

In this aligned state, the aligning direction 2a of the liquid crystal molecules near the rear-side substrate 2 is set to a direction within the angle range of about 10° to about 25° in the counterclockwise direction with respect to the abscissa x on the display surface when viewed from the front side of the device, and the liquid crystal molecules are twisted, from the rear-side substrate 2 to the front-side substrate 1, at a twist angle of almost 90° in the clockwise direction with respect to the aligning direction 2a of the liquid crystal molecules when viewed from the front side of the device.

Note that the above aligned state is a more preferable example. Even if the aligning directions 1a and 2a of the liquid crystal molecules near the two substrates 1 and 2 deviate from the above angles by about 5°, almost the same effects as those of the first embodiment and the modification are obtained. The aligned state of the liquid crystal molecules may therefore be set such that the aligning direction 2a of the liquid crystal molecules near the rear-side substrate 2 is set to a direction within the angle range of 5° to 30° in the counterclockwise direction with respect to the horizontal direction (abscissa x) of the display surface when viewed from the front side of the device.

In addition, the aligned state of the liquid crystal modules may be set such that the aligning direction 2a of the liquid crystal molecules near the rear-side substrate 2 is set to a direction within the angle range of 0° (exclusive) to 45° (exclusive) in the counterclockwise direction with respect to the horizontal direction (abscissa x) of the display surface when viewed from the front side of the device.

When the aligned state of the liquid crystal molecules is set within this range, a display observed from normal direction can be made sufficiently brighter than that in the conventional liquid crystal display device while satisfactory contrast is maintained.

[Second Embodiment]

Figure 20:
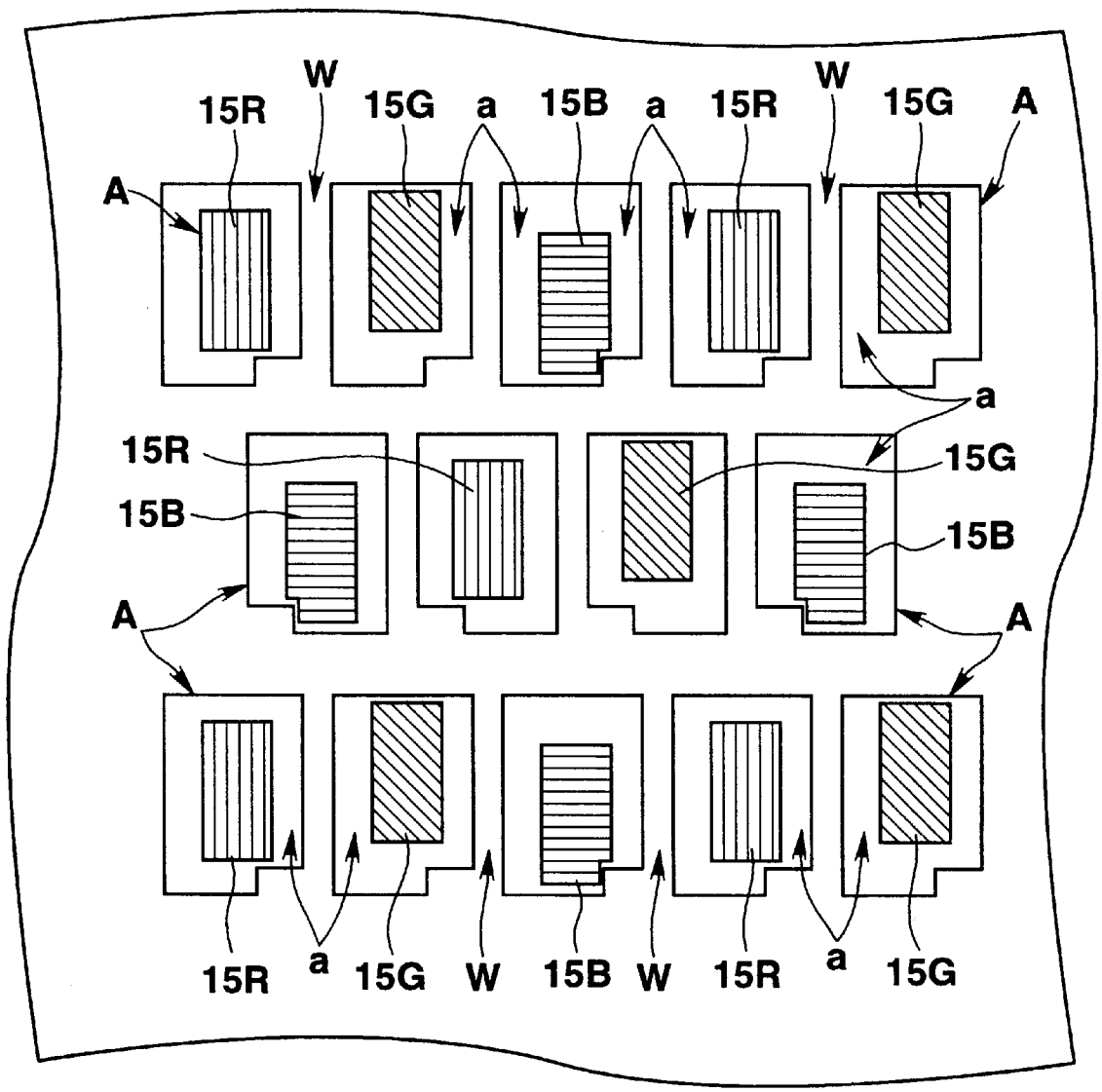
FIG. 20 is a plan view showing the arrangement of pixels and color filters of a liquid crystal display device according to the second embodiment.
Figure 21:
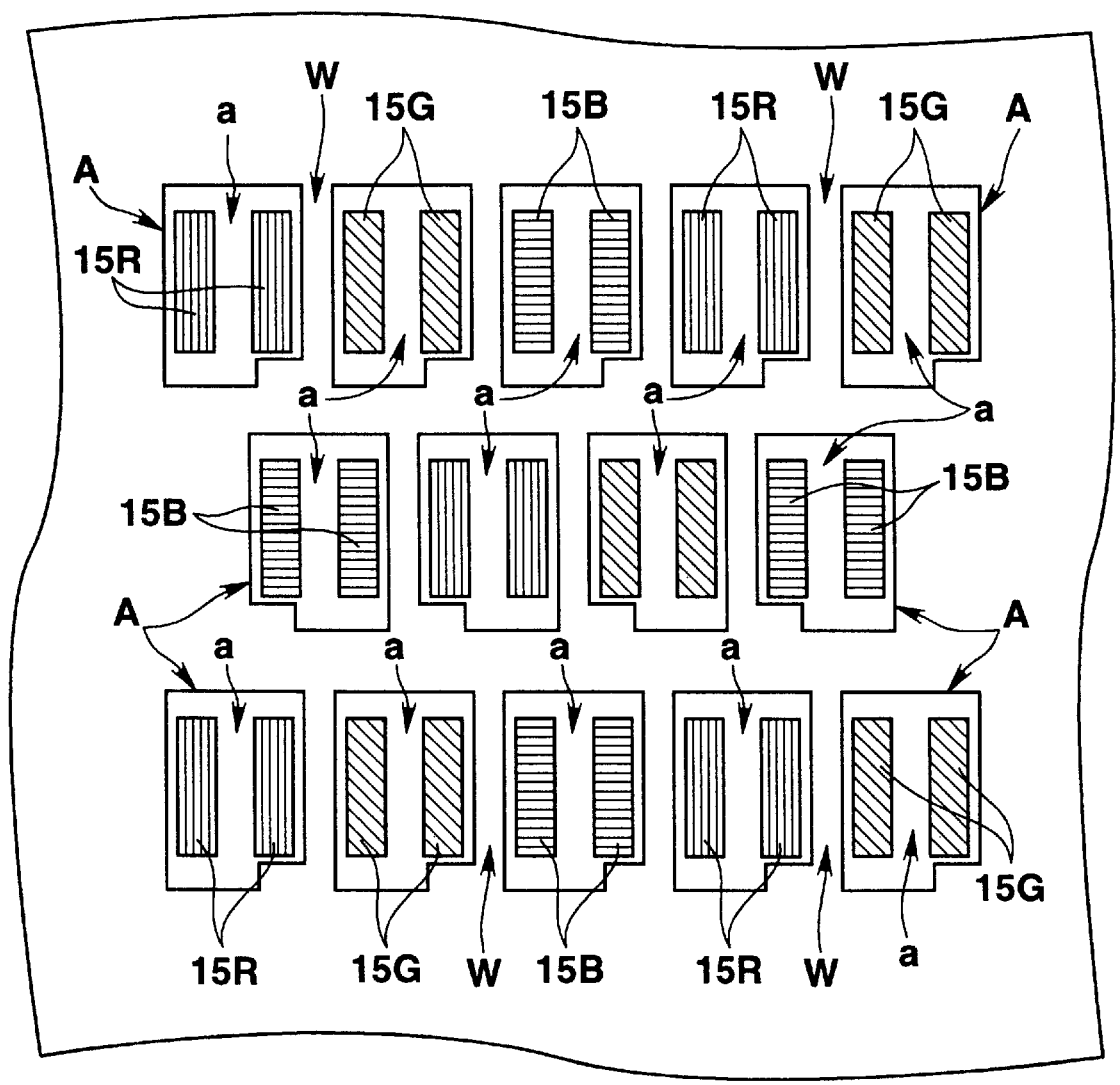
FIG. 21 is a plan view showing the arrangement of pixels and color filters of a modification of the liquid crystal display device according to the second embodiment.
Figure 22:
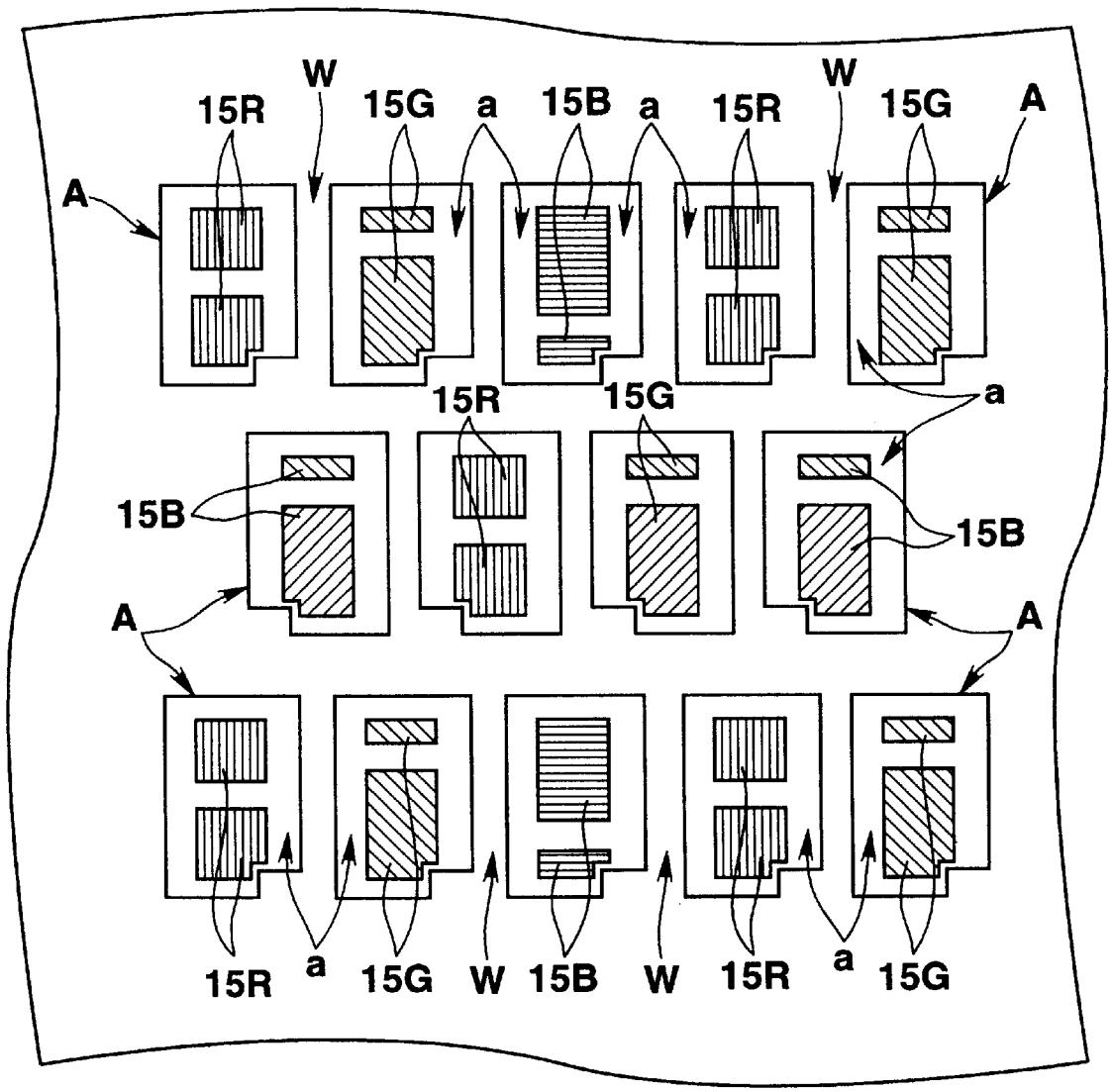
FIG. 22 is a plan view showing the arrangement of pixels and color filters of another modification of the liquid crystal display device according to the second embodiment.

FIGS. 20 to 22 show the second embodiment of the present invention. A description of the same constituent elements as those of the first embodiment will be omitted.

FIG. 20 is a plan view showing the arrangement of pixels and color filters according to the second embodiment. Referring to FIG. 20, color filters 15R, 15G, and 15B of the respective colors are arranged in pixel regions A in correspondence with the middle portions of the respective pixel areas A in the widthwise direction. In addition, the respective color filters 15R, 15G, and 15B arranged in the horizontal direction of the screen are alternately shifted in the vertical direction within the pixel areas A.

The areas outside the color filters 15R, 15G, and 15B in the respective pixel areas A serve as non-colored light exit areas b through which light incident from the front surface side of a front-side substrate 1, reflected by a scattering reflecting member 23 placed on the rear surface side of a rear-side substrate 2, and emerging toward the front surface side of the front-side substrate 1 is transmitted without being colored.

This liquid crystal display device displays in the normally white mode, as described above. In the device, the areas between the respective adjacent pixel areas A, i.e., the non-electric-field areas where liquid crystal molecules are always aligned in the initial twisted state, serve as bright display areas W from which light incident from the front surface side of the front-side substrate 1 and reflected by the reflecting member 23 or gate lines 10, data lines 11, and capacitance formation electrodes 12 emerges toward the front surface side of the front-side substrate 1.

More specifically, the gate lines 10 and the data lines 11 formed on the inner surface of the rear-side substrate 2 extend through the bright display areas x, and the capacitance formation electrodes 12 also cross the bright display areas W. For this reason, of the light incident on the bright display areas W from the front side, light incident on the portions, of the bright display areas W, which the gate lines 10, the data lines 11, and the capacitance formation electrodes 12 cross does not enter the reflecting member 23, but is reflected by the gate lines 10, the data lines 11, and the capacitance formation electrodes 12 because they are made of high-reflectance metal films.

This liquid crystal display device therefore performs a reflection type display by using external light. In the device, light incident from the front-side substrate 1 is transmitted through a front-side polarizing plate 21 to become linearly polarized light. This light is sequentially transmitted through a liquid crystal layer LC and a rear-side polarizing plate 22 and reflected by the reflecting member 23 or the gate lines 10, the gate lines 11, and the capacitance formation electrodes 12. The reflected light is sequentially transmitted through the rear-side polarizing plate 22, the liquid crystal LC, and the front-side polarizing plate 21 and emerges toward the front-side substrate 1.

In the liquid crystal display device of the above embodiment, since the positions of the color filters of different colors are alternately shifted in the vertical direction of the screen, light which is incident from the horizontal direction of the screen, transmitted through one of the pixel areas A corresponding to color filters of different colors arranged in the horizontal direction of the screen, and transmitted through the other pixel area A to emerge therefrom is unlikely to pass through both the color filter corresponding to one of the pixel areas A and the color filter of a different color corresponding to the other pixel area A. The amount of light absorbed by the color filters 15R, 15G, and 15B of the different colors can therefore be reduced.

In the above embodiment, the width and length of each of the color filters 15R, 15G, and 15B of the respective colors are smaller than those of the pixel area A. However, either the width or length of each of the color filters 15R, 15G, and 15B may be set to be almost equal to that of the width of the pixel area A.

Note, however, that the width of each of the color filters 15R, 15G, and 15B is preferably set to be smaller than that of the pixel area A. With this setting, as in the above embodiment, as the areas on the sides of the color filters in the pixel areas A serve as the non-colored light exit areas b, light which is transmitted through one of the pixel areas A corresponding to color filters of different colors arranged in the horizontal direction of the screen, and incident on the other pixel area A is less likely to pass through both the color filter corresponding to one of the pixel areas A and the color filter of a different color corresponding to the other pixel area A. The amount of light absorbed by these color filters of the different colors can therefore be further reduced, and the utilization efficiency of light incident from the horizontal direction of the screen can be increased.

FIG. 21 is a plan view showing the arrangement of pixels and color filters as a modification of the second embodiment. In this pixel arrangement, each of the color filters 15R, 15G, and 15B corresponding to each pixel area A is divided into two filters in the horizontal direction of the screen, and the divided filters are spaced apart from each other. The area between the divided filters in each pixel area A serves as the non-colored light exit area b, and the entire peripheral portions of the pixel areas A which are located between the respective pixel areas A serve as the bright display areas W. In this modification, the respective divided filters are elongated in the vertical direction of the display screen and aligned in the vertical direction. In addition, the non-colored light exit areas b which are located between the divided filters and from which non-colored light emerges and the bright display areas W are aligned in the vertical direction of the display screen. Since the liquid crystal display device of this embodiment has oblong non-colored light exit areas extending along the vertical direction of the screen, a sufficiently bright color image can be displayed by using external light.

FIG. 22 is a plan view showing the third modification of the second embodiment. In this pixel arrangement, each of the color filters 15R, 15G, and 15B of the respective colors is divided into two filter sections in the vertical direction of the screen, and the non-colored light exit areas b are arranged in the respective pixel areas A. In addition, the positions at which the color filters 15R, 15G, and 15B of the respective colors arranged in the horizontal direction of the screen are divided are alternately shifted in the vertical direction of the screen.

In the liquid crystal display device of the third modification as well, both light incident from the upper side of the screen and light incident from the horizontal direction of the screen can be efficiently used, and hence a sufficiently bright color image can be displayed on the screen.

[Third Embodiment]

Figure 23:
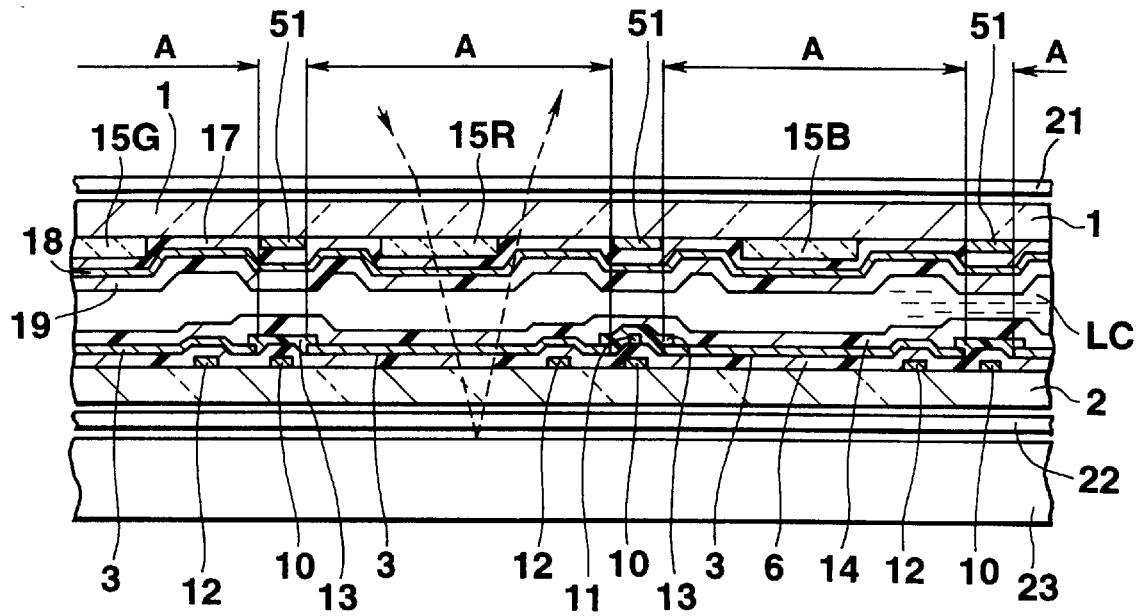
FIG. 23 is a sectional view showing a liquid crystal display device according to the third embodiment.

FIG. 23 is a sectional view of a liquid crystal display device according to the third embodiment of the present invention. Note that the same reference numerals in the third embodiment denote the same parts as in first embodiment, and a description thereof will be omitted.

As shown in FIG. 23, a plurality of reflecting members 51 for reflecting light incident from the front side of the device toward the front side of the device are formed on the inner surface of a front-side substrate 1 to extend between the rows and columns of color filters 15R, 15G, and 15B. Each reflecting member 51 is made of a metal film such as a high-reflectance silver or aluminum-based alloy film. The reflecting members 51 are formed to correspond to almost the entire areas between the rows and columns of pixel areas A. External light incident on the areas between the respective pixel areas A is reflected by the reflecting members 51. Therefore, the areas between the respective pixel areas A are made bright to increase the overall brightness of the screen.

[Fourth Embodiment]

Figure 24:
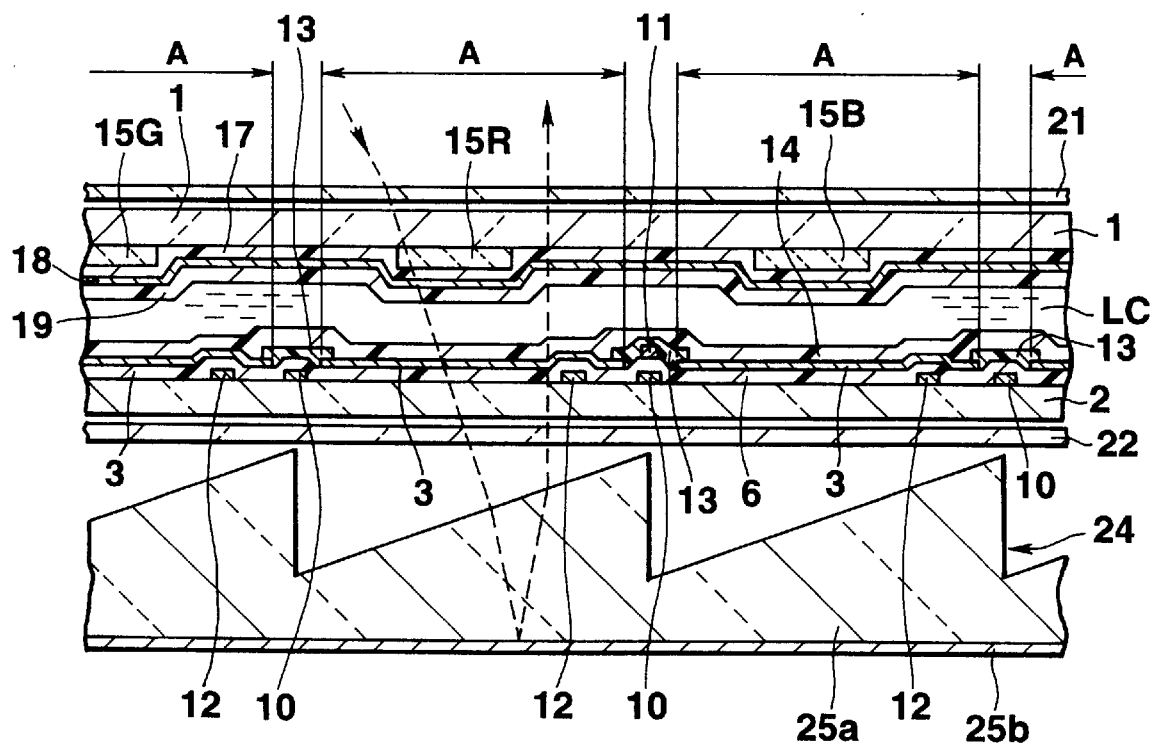
FIG. 24 is a sectional view showing a liquid crystal display device according to the fourth embodiment.

FIG. 24 is a sectional view of a liquid crystal display device according to the fourth embodiment of the present invention. In this liquid crystal display device, a reflecting member 24 for reflecting incident light transmitted through a liquid crystal layer LC in a direction almost perpendicular to the liquid crystal layer LC is formed in place of the scattering reflecting member 23 placed on the rear surface of the rear-side substrate 2 in the first embodiment. Other arrangements are the same as those in the first embodiment.

The reflecting member 24 is constituted by a microprism sheet 25*a* and a white mirror reflecting film 25*b* formed on the rear surface of the microprism sheet 25*a*.

The microprism sheet 25*a* is formed by forming narrow, elongated prism portions, each continuously extending in one direction, on the surface of a transparent substrate made of, e.g., a glass or acrylic resin material, such that the prism portions are densely arranged to be parallel to each other. Each prism portion has a cross-section in the form of a right triangle. That is, one side surface of each prism portion is a vertical surface, and the other side surface is an inclined surface having a predetermined inclination.

The width of each prism portion of the microprism sheet 25a is preferably set such that one prism portion corresponds to one pixel electrode row or two or three pixel area rows.

The inclined surface of each prism portion of the microprism sheet 25a of the reflecting member 24 is directed to the main incident direction of external light so that a larger amount of external light is incident from the upper oblique side of the screen, i.e., a direction inclined toward the upper edge side of the screen with respect to a direction perpendicular to the front surface of the display device.

According to the liquid crystal display device of the fourth embodiment, since incident light is reflected by the reflecting member 24 in a direction almost perpendicular to the plane of the liquid crystal layer LC as indicated by the dashed line arrow in FIG. 24, the incident light transmitted through the peripheral portion of a given pixel area A is less likely to be transmitted through another adjacent pixel area A to emerge therefrom. Therefore, the amount of incident light absorbed by the color filters can be decreased to increase the amount of exit light. Consequently, a bright display can be obtained, and a high-quality color image can be displayed.

In addition, according to this liquid crystal display device, since incident light is reflected by the reflecting member 24 in a direction almost perpendicular to the plane of the liquid crystal layer LC, the amount of light emerging toward the front side, i.e., in a direction perpendicular to the front surface of the device, can be increased, thereby increasing the brightness of the front surface of the display screen.

[Fifth Embodiment]

Figure 25:
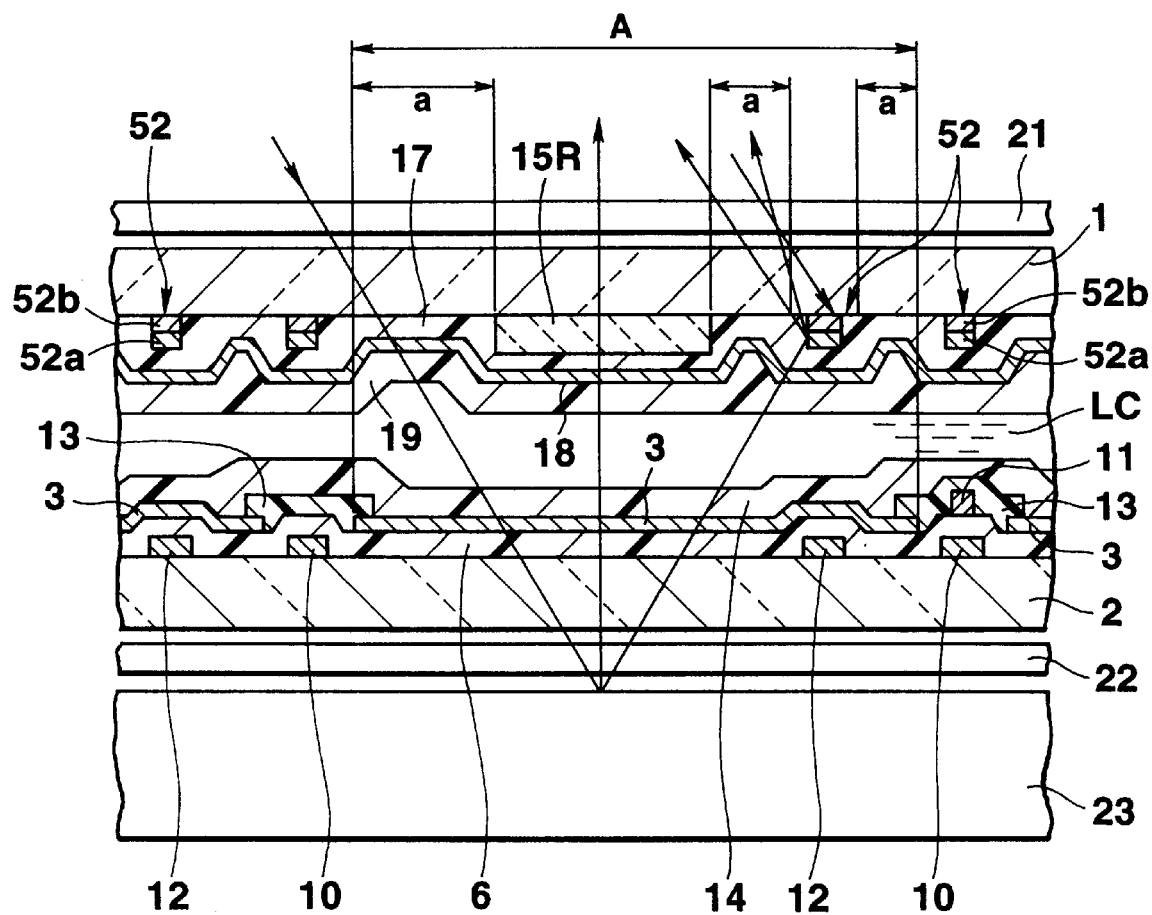
FIG. 25 is a sectional view showing a liquid crystal display device according to the fifth embodiment.

FIG. 25 is a sectional view of a liquid crystal display device according to the fifth embodiment of the present invention. The same reference numerals in the fifth embodiment denote the same parts as in the first embodiment, and a description thereof will be omitted.

Referring to FIG. 25, color filters 15R, 15G, and 15B of the primary colors, i.e., red, green, and blue, are alternately arranged on the inner surface of a front-side substrate 1 in the row and column directions in correspondence with pixel electrodes 3 on a rear-side substrate 2. In addition, a plurality of side-surface reflecting members 52 are formed on the inner surface of the front-side substrate 1 in correspondence with TFTs 4, gate lines 10, data lines 11, and capacitance formation electrodes 12 on the rear-side substrate 2. At least one transparent counter electrode 18 is formed on a transparent protective film (insulating film) 17 formed to cover these side-surface reflecting members 52. The counter electrode 18 opposes all the pixel electrodes 3. Pixel areas A are formed by the portions where the counter electrode 18 opposes the pixel electrodes 3. An aligning film 19 is formed on the counter electrode 18.

Each of the side-surface reflecting members 52 is formed by sequentially stacking a low-reflectance film 52b made of a chromium oxide film or the like and a high-reflectance film 52a made of a chromium film or the like on the inner surface of the front-side substrate 1, and patterning the stacked films by photolithography. The portion, of each side-surface reflecting member 52, which corresponds to the TFT 4 is formed to have an area large enough to cover almost the entire TFT 4, whereas the portion, of each side-surface reflecting member 52, which corresponds to the gate line 10, the data line 11, and the capacitance formation electrode 12 is formed into a continuous linear shape having a width equal to or smaller than the widths of the corresponding lines 10 and 11 and the corresponding capacitance formation electrode 12, or formed into a dot-like shape extending along the corresponding lines 10 and 11 and the corresponding capacitance formation electrode 12.

Note that the gate line 10 and the capacitance formation electrode 12 are formed to have widths slightly smaller than the width of the inter-pixel area (the distance between the adjacent pixel areas A), and the data line 11 is formed to have a width sufficiently smaller than the width of the inter-pixel area. The width of the linear portion of the side-surface reflecting member 52 is set to be equal to or smaller than the width of the data line 11, which is the narrowest of the gate line 10, the data line 11, and the capacitance formation electrode 12.

In this embodiment, the width of the inter-pixel area is about 10 $\mu$m, the width of the data line 11 is about 6 $\mu$m, and the width of the linear portion of the side-surface reflecting member 52 is about 6 pm or less.

The side-surface reflecting member 52 is adapted to change the exit direction of light incident from the front side of the device, reflected by a reflecting member 23 on the rear side, and emerging toward the front side of the device by reflecting the light by a side surface of the high-reflectance film 52a. The portion, of each side-surface reflecting member 52, which corresponds to the inter-pixel area, i.e., the TFT 4, the gate line 10, and the data line 11, surrounds almost the entire perimeter of each pixel area A. The portion, of each side-surface reflecting member 52, which corresponds to the capacitance formation electrode 12 crosses a portion of a non-colored light exit area b of each pixel area A, i.e., a portion of the non-colored light exit area b on the upper edge side of each pixel area A, in the horizontal direction of the screen.

The portion, of the side-surface reflecting member 52 formed on the inner surface of the front-side substrate 1, which corresponds to the gate line 10 and the data line 11 corresponds to this inter-pixel area. The actual exit area of the inter-pixel area is smaller than the intern-pixel area by the area of the portion opposing the side-surface reflecting member 52. As described above, however, since the width of the inter-pixel area is about 10 $\mu$m, and the width of the side-surface reflecting member 52 is about 6 $\mu$m or less, the decrease in the exit area of the inter-pixel area is very small.

Since this liquid crystal display device has the side-surface reflecting members 52, of the light which is incident from the front side of the device, reflected by the reflecting member 23 on the rear side, and emerges toward the front side of the device, light emerging from the inter-pixel area and a portion of the non-colored light exit area b of the pixel area A is reflected by the side surface of the side-surface reflecting member 52 to change its direction, as indicated by the arrows in FIG. 25. As a result, the scattered/reflected light emerges as light having a luminance distribution in which the amount of light emerging toward the front side (i.e., directions near a direction perpendicular to the screen) is large.

Light incident on the inter-pixel area between the adjacent pixel areas A is reflected as non-colored light (white light) and emerges toward the front side of the device. This non-colored light emerging from each inter-pixel area is always light having a high intensity because the liquid crystal molecules in the inter-pixel area always remain in the initial twisted state.

In this liquid crystal display device, since each of the color filters 15R, 15G, and 15B corresponding to the respective pixel areas A is formed to have an area smaller than that of each pixel area A, only the non-colored light exit area b, of each pixel area A, which does not correspond to the color filter, but also each inter-pixel area serves as areas through which light incident from the front side of the device, reflected by the reflecting member 23 or the gate and data lines 10 and 11 and the capacitance formation electrode 12, and emerging toward the front side of the device is transmitted without being colored. Since light reflected by the side surface of each side-surface reflecting member 52 and emerging as light having a luminance distribution in which the amount of light emerging toward the front side is large is high-luminance non-colored light, the brightness of the screen observed from the front side is further increased.

Furthermore, in the above liquid crystal display device, light incident from the upper oblique side of the screen, i.e., the main incident direction of external light, and reflected by the reflecting member 23 and the like efficiently enters both the side surface, of the side-surface reflecting member 52, which corresponds to the area, of the inter-pixel area, extending in the horizontal direction of the screen, and extends in the horizontal direction, and the side surface, of the side-surface reflecting member 52, which corresponds to a portion of the non-colored light exit area b of the pixel area A and crosses in the horizontal direction of the screen. Therefore, the amount of light reflected by these side surfaces of each side-surface reflecting member 52 is increased to effectively increase the luminance of the front surface of the screen.

[Sixth Embodiment]

Figure 26:
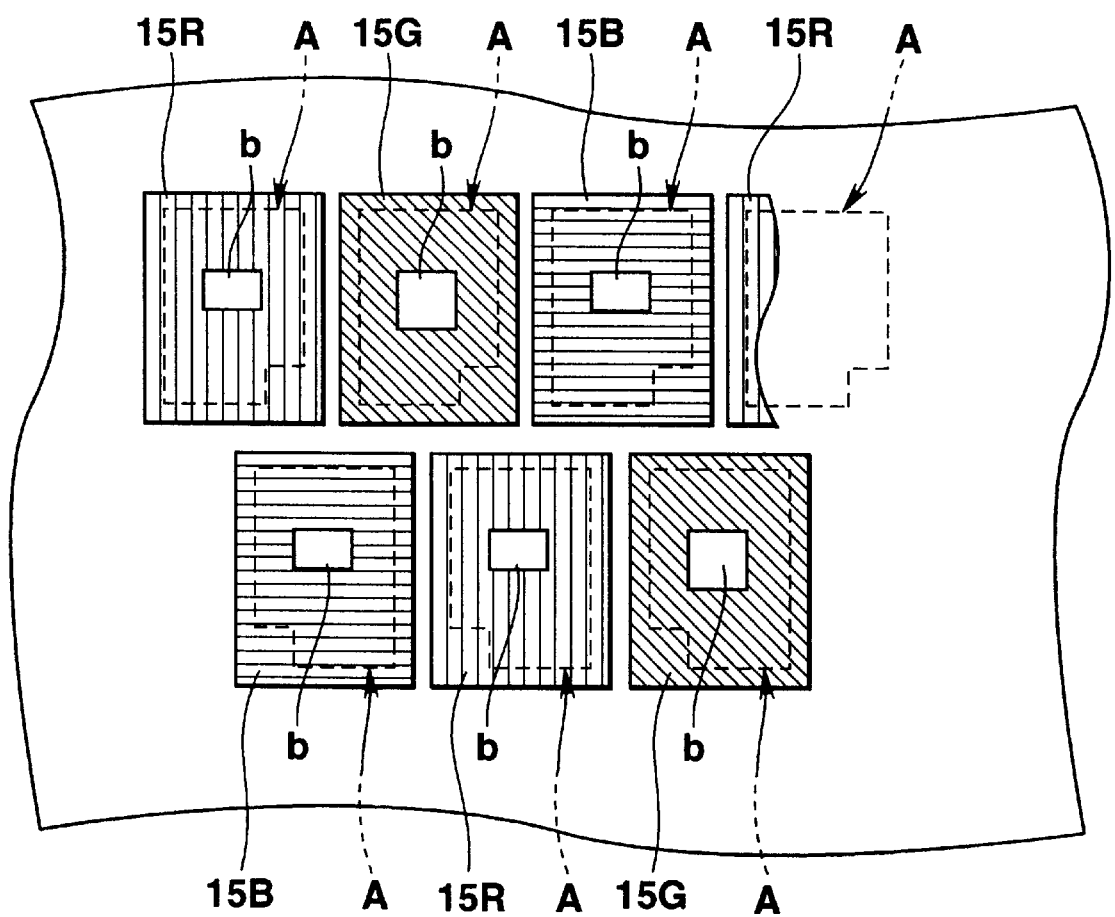
FIG. 26 is a plan view showing the arrangement of pixels and color filters of a liquid crystal display device according to the sixth embodiment.

FIG. 26 is a plan view showing the arrangement of pixels and color filters of a liquid crystal display device according to the sixth embodiment of the present invention. Note that the same reference numerals in the sixth embodiment denote the same parts as in the above embodiments, and a description thereof will be omitted.

Referring to FIG. 26, color filters 15R, 15G, and 15B are arranged on the peripheral portions of pixel areas A, and non-colored light exit areas b are formed in the central portions of the respective pixel areas. Assume that the peripheral portions of the pixel areas A are used as the non-colored light exit areas b as in the first embodiment in FIG. 2. In this case, if a positional offset occurs when a front-side substrate 1 and a rear-side substrate 2 are bonded, the relative positions of wiring materials on the rear-side substrate 2 and black masks or color filters on the front-side substrate 1 change at the peripheral portions of the pixel areas A, so that areas of the non-colored light exit areas b change. As a result, the brightness of the pixel areas A varies depending on display devices. In contrast to this, according to the sixth embodiment, the central portions of the pixel areas A are used as the non-colored light exit areas b, and the peripheral portions are used as colored light exit areas. The colored light exit areas are therefore the portions whose areas change owing to the above positional offset, but the areas of the non-colored light exit areas b with a high luminance do not change. For this reason, variations in brightness among display devices can be reduced.

[Seventh Embodiment]

Figure 27:
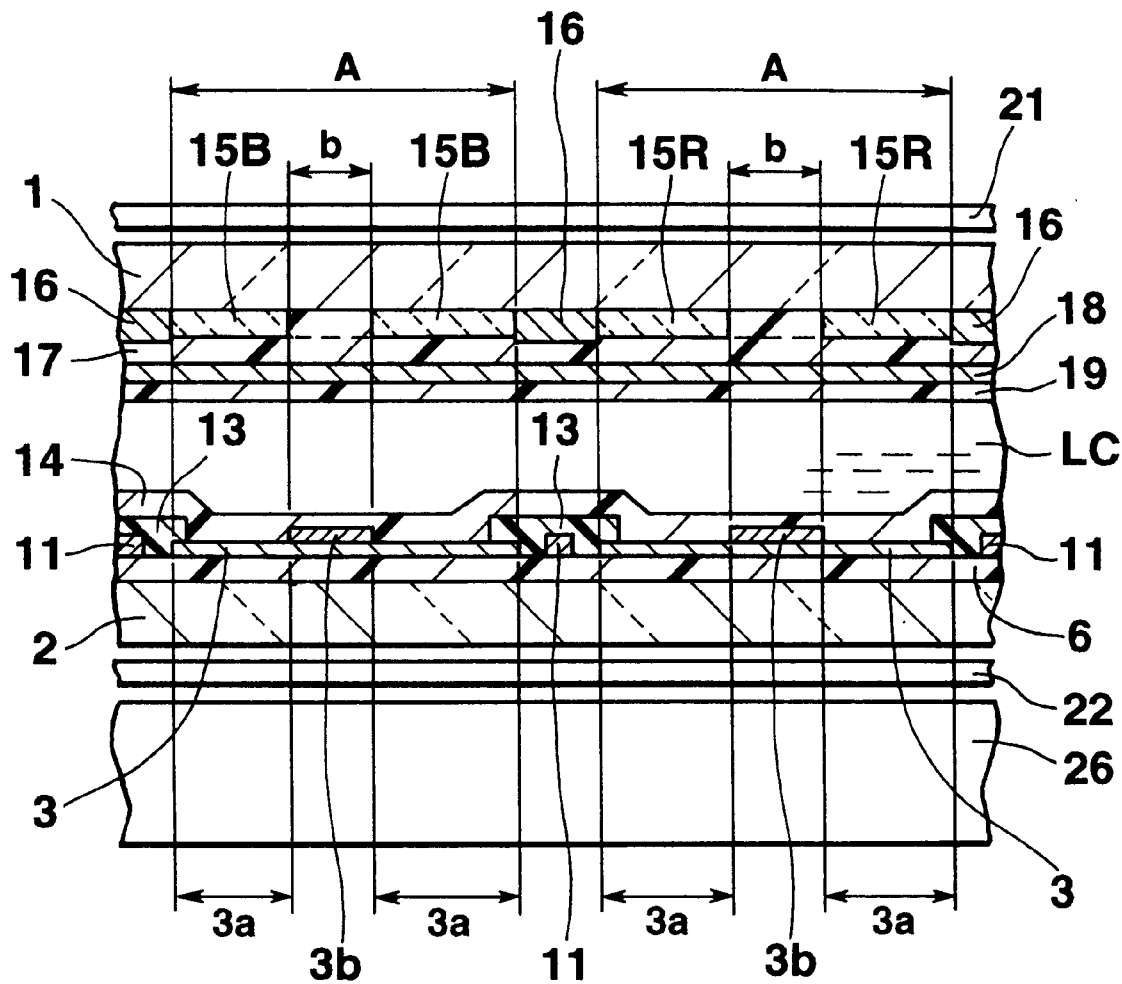
FIG. 27 is a sectional view showing a liquid crystal display device according to the seventh embodiment.
Figure 28:
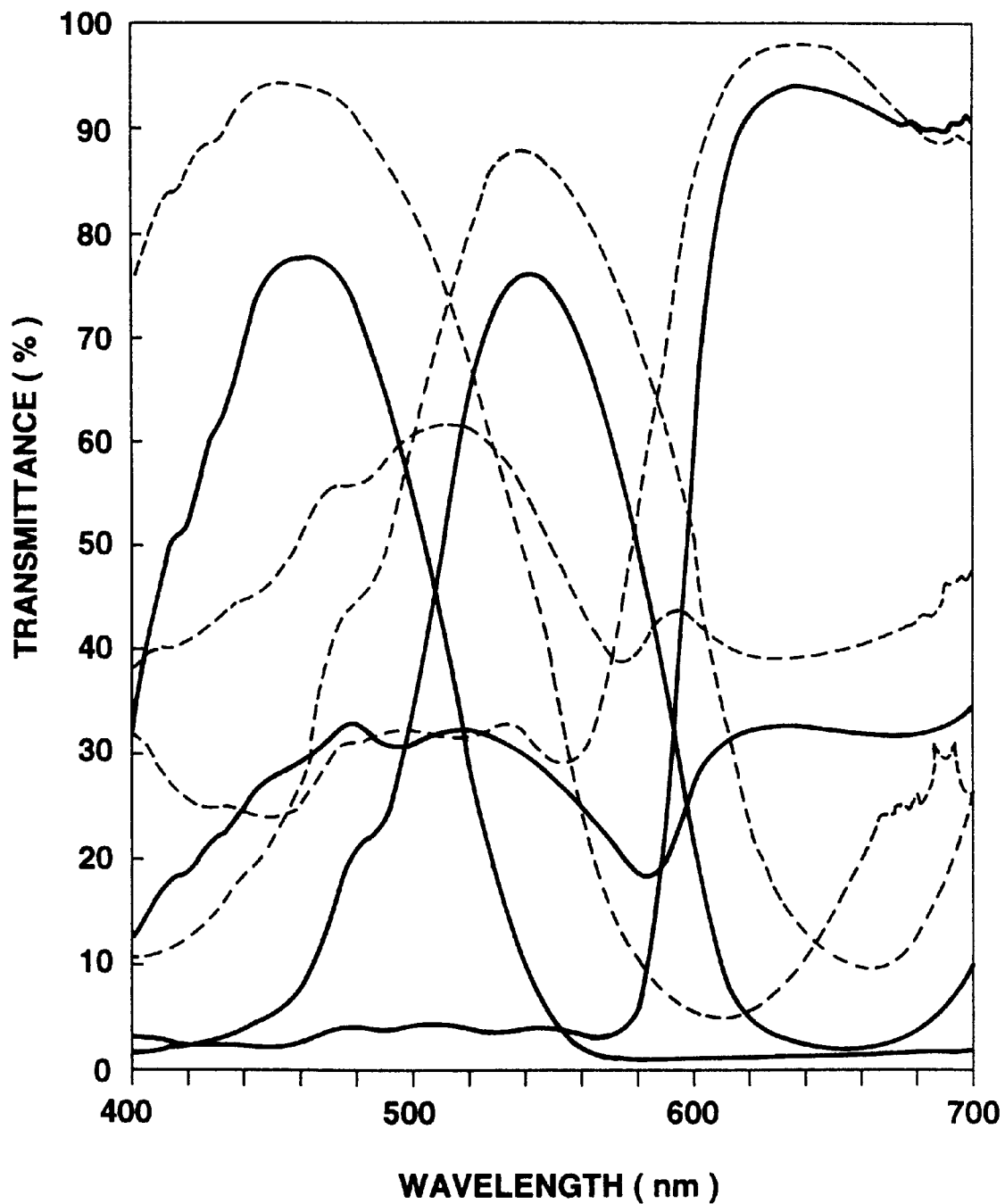
FIG. 28 is a graph showing the relationship between the thickness and spectral transmittance of each color filter in the prior art.

FIG. 27 is a sectional view of a liquid crystal display device according to the seventh embodiment of the present invention. Note that the same reference numerals in the seventh embodiment denote the same parts as in the above embodiments, and a description thereof will be omitted.

Referring to FIG. 27, a non-colored light exit area b is formed in the central portion of the pixel area A, the portion of the pixel electrode formed from a transparent conductive film, corresponding to the non-colored light exit area b is covered with a conductive reflecting film 3b made of metal or the like, and the portion of the pixel electrode 3, which is not covered with the reflecting film 3b constitutes a light transparent region 3a, so that a part of light which passes the portion in the pixel electrode A to the front-side substrate 1 side from the rear-side substrate 2 side.

According to this liquid crystal display device of the seventh embodiment, external light incident on a front-side substrate 1 is transmitted through either the non-colored light exit area b or the colored light exit area a, and reflected by the reflecting film 3b or a reflecting member 23 on the rear surface of a rear-side substrate 2. The light then emerges toward the front side of the device.

In the seventh embodiment, a semitransparent reflecting plate 26 can be used on the rear surface of the rear-side substrate 2 in place of a reflecting member such as the scattering reflecting member 23. In this case, illumination light is irradiated from a backlight (not shown) onto the rear surface of the rear-side substrate 2, and is transmitted through the semitransparent reflecting plate 26. This light is then transmitted through only the colored light exit area a but cannot be transmitted through the non-colored light exit area b because of the conductive reflecting film 3b. This device can therefore be used as both a transmission type device and a reflection type device without causing any deterioration in contrast.

Although the formation area of the conductive reflecting film 3b may be the same as that of the non-colored light exit area b, it may desirably be formed to have a somewhat wider area than that of the latter. In this case, a transmission light illuminated from the rear-side substrate 2 side toward the front-side substrate 1 side can be shielded positively by the conductive reflecting film 3b. Although the conductive reflecting film 3b is formed on the liquid crystal layer LC side layer with respect to the pixel electrode 3, it may be formed on the rear-side substrate 2 side layer.

In addition, the liquid crystal display device of the present invention can be used as a transmission type device without using any reflecting plate. In this case as well, a bright color image can be displayed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A liquid crystal display device comprising:
   a pair of substrates opposing each other;
   a plurality of first electrodes formed on one of opposing surfaces of said pair of substrates;
   at least one second electrode formed on the other of the opposing surfaces to oppose said plurality of first electrodes to thereby form a plurality of pixel areas defined by areas where said at least one second electrode opposes said first electrodes;
   coloring films having a plurality of colors formed on one of inner surfaces of said pair of substrates in correspondence with said pixel areas, at least one of said coloring films having a given color and an area smaller than an area of a corresponding one of said pixel areas, and an area ratio of said at least one coloring film differing from an area ratio of other ones of said coloring films having other colors;
   a liquid crystal layer sandwiched between said pair of substrates; and a reflecting member for reflecting light transmitted through said liquid crystal layer.

2. A device according to claim 1, wherein:

each of said coloring films comprises a color filter having an area smaller than an area of one of said pixel areas corresponding thereto, an area corresponding to each of said color filters forms a colored light exit area which colors incident light and outputs the colored light, and an area which does not correspond to each of said color filters forms a non-colored light exit area from which incident light is output without being colored.

3. A device according to claim 2, wherein each of said color filters is provided in a central portion of the pixel area corresponding thereto except for a peripheral portion, and each said pixel area comprises the non-colored light exit area formed by the peripheral portion and the colored light exit area formed by the central portion.

4. A device according to claim 1, wherein said coloring films comprise a plurality of color filters of different colors corresponding to respective pixel areas, said color filters being arranged at equal intervals in correspondence with said respective pixel areas.

5. A device according to claim 1, wherein each of said coloring films is formed into an oblong shape on a surface parallel to one of the substrate surfaces such that a dimension along a horizontal direction when viewed from a front side of said liquid crystal display device is smaller than a dimension in a direction perpendicular to the horizontal direction.

6. A device according to claim 1, wherein said plurality of pixel areas are arranged at predetermined intervals, and bright display areas which output light are formed in inter-pixel areas between said plurality of pixel areas.

7. A device according to claim 2, wherein said non-colored light exit area is formed on a surface parallel to one of the substrate surfaces to have an oblong shape elongated in a longitudinal direction perpendicular to a horizontal direction when viewed from a front side of said liquid crystal display device.

8. A device according to claim 2, wherein said non-colored light exit areas formed in said plurality of pixel areas are arranged on a surface parallel to one of the substrate surfaces on a substantial line extending in a longitudinal direction perpendicular to a horizontal direction when viewed from a front side of said liquid crystal display device.

9. A device according to claim 1, wherein each of said pixel areas comprises a colored light exit area having a plurality of coloring films arranged on a surface parallel to one of the substrate surfaces to be divided in a direction along a horizontal direction when viewed from a front side of said liquid crystal display device.

10. A device according to claim 1, wherein each of said pixel areas comprises a colored light exit area having a plurality of coloring films arranged on a surface perpendicular to one of the substrate surfaces to be divided in a direction along a horizontal direction when viewed from a front side of said liquid crystal display device.

11. A device according to claim 1, wherein each of said pixel areas has a colored light exit area, and said coloring films have a shape other than a rectangular shape.

12. A device according to claim 1, wherein said coloring films have different colors and are arranged in said pixel areas adjacent to each other in a horizontal direction when viewed from a front side of said liquid crystal display device, in a manner such that the coloring films are alternately shifted in a direction perpendicular to the horizontal direction.

13. A device according to claim 1, wherein each of said pixel areas comprises a colored light exit area having one of said coloring films placed near a peripheral portion thereof, and a non-colored light exit area formed in a central portion thereof.

14. A device according to claim 1, wherein said reflecting member is provided on an outer surface of said substrate on an opposite side to a side on which light is incident.

15. A device according to claim 14, wherein said reflecting member comprises a reflecting plate having directivity to reflect light which has a narrower angle of radiation than an angle range of incident light.

16. A device according to claim 1, wherein said reflecting member is formed on an inner surface of a rear-side substrate located on an opposite side to a side on which light is incident.

17. A device according to claim 1, wherein a plurality of reflecting films are provided between said plurality of pixel areas to reflect light incident between said pixel areas.

18. A device according to claim 17, wherein said reflecting films are provided on an inner surface of the substrate on a side on which light is incident.

19. A device according to claim 17, wherein said reflecting films are provided on an inner surface of the substrate opposing the substrate on a side on which light is incident.

20. A device according to claim 1, further comprising a side-surface reflector provided on one of the inner surfaces of said pair of substrates and having a reflecting film which is formed on at least a side surface to reflect light at a smaller exit angle than an angle of light incident on said substrate.

21. A device according to claim 20, wherein said side-surface reflector is provided along a horizontal direction of said liquid crystal display device.

22. A device according to claim 20, wherein said side-surface reflector surrounds said pixel area.

23. A device according to claim 20, wherein:

each of said coloring films comprises a color filter having an area smaller than an area of one of said pixel areas corresponding thereto, an area corresponding to each of said color filters forms a colored light exit area which colors incident light and outputs the colored light, an area which does not correspond to each of said color filters forms a non-colored light exit area from which incident light is output without being colored, and said side-surface reflector crosses a portion of said non-colored light exit area.

24. A device according to claim 20, wherein said side-surface reflector comprises a reflecting film formed into a linear shape.

25. A device according to claim 20, wherein said side-surface reflector comprises an array of a plurality of dot-like reflecting films.

26. A device according to claim 20, wherein said side-surface reflector comprises a multilayer film made of a high-refractive-index material and a low-refractive-index material, and a layer made of the high-refractive-index material is provided near said substrate.

27. A device according to claim 1, wherein said coloring films comprise color filters for transmitting light beams of different colors, and said color filters of the different colors respectively have different area ratios with respect to corresponding pixel areas.

28. A device according to claim 27, wherein said color filters include a first color filter which transmits at least light on a short wavelength side in a visible range and having an area smaller than a pixel area corresponding thereto, and a second color filter which transmits light on a long wavelength side and having an area ratio larger than that of the first color filter.

29. A device according to claim 1, wherein said coloring films comprise a first coloring film which transmits light in an intermediate wavelength range in a visible range, a second coloring film which transmits light in a long wavelength range, and a third coloring film which transmits light in a short wavelength range, and wherein thicknesses of said first to third coloring films increase in order, and the thicknesses of said coloring films are set to maximize a color gamut defined by color coordinates of said respective coloring films.

30. A device according to claim 29, wherein said coloring films include color filters of red, green, and blue.

31. A device according to claim 30, wherein said color filters of the respective colors have thicknesses such that an area of the color gamut becomes not less than 750 on the a*b* plane on the CIE 1976 L*a*b* L*a*b* color system.

32. A device according to claim 30, wherein said color filters of the respective colors have thicknesses such that a white chroma of a mixture of colored light beams transmitted through said color filters of the respective colors becomes not more than 1.5 on the a*b* plane on the CIE 1976 L*a*b L*a*b color system.

33. A device according to claim 30, wherein said color filters of the respective colors comprise red, green, and blue filters having a pigment-dispersed material, said red filter having a thickness of 0.9 to 1.2 $\mu$m, said green filter having a thickness of 0.8 to 1.1 $\mu$m, and said blue filter having a thickness of 1.1 to 1.4 $\mu$m.

34. A device according to claim 30, wherein said color filters of the respective colors respectively have different area ratios, and the area ratios with respect to corresponding pixel areas increase in order of a coloring film which transmits light in the intermediate wavelength range, a coloring film which transmits light in the short wavelength range, and a coloring film which transmits light in the long wavelength range.

35. A device according to claim 30, wherein at least said green and blue filters have areas smaller than the pixel areas corresponding thereto, and an area which does not correspond to said color filters forms a non-colored light exit area.

36. A device according to claim 30, wherein said red, green, and blue filters respectively have thicknesses of 0.9 to 1.2 $\mu$m, 0.8 to 1.1 $\mu$m, and 1.1 to 1.4 $\mu$m, and area ratios of 90 to 95%, 60 to 65%, and 75 to 80% with respect to said pixel areas corresponding thereto.

37. A device according to claim 30, wherein said liquid crystal layer has a first liquid crystal layer thickness d1 corresponding to an area in which said color filters are formed, and a liquid crystal layer d2 corresponding to an area other than the area in which said color filters are formed, and products $\Delta$nd1 and $\Delta$nd2 of the liquid crystal thicknesses d1 and d2 and a refractive index anisotropy $\Delta$n of said liquid crystal layer are set to make a spectral transmittance distribution obtained by synthesizing a spectral transmittance distribution of light transmitted through a liquid crystal element having the product $\Delta$d1 and a spectral transmittance distribution of light transmitted through a liquid crystal element having the product $\Delta$nd2 substantially flat in a visible range.

38. A device according to claim 29, wherein molecules in said liquid crystal layer sandwiched between said pair of substrates liquid crystal near a front-side substrate on which light is incident are aligned counterclockwise within a range of 0° to 45° with respect to a horizontal direction of said front-side substrate, and are twisted clockwise toward a rear-side substrate opposing said front-side substrate at a twist angle of 90°.

39. A device according to claim 1, wherein said liquid crystal layer has a first liquid crystal layer thickness d1 corresponding to an area in which said coloring films are formed, and a liquid crystal layer thickness d2 corresponding to an area other than the area in which said coloring films are formed, and products $\Delta$nd1 and $\Delta$nd2 of the liquid crystal thicknesses d1 and d2 and a refractive index anisotropy $\Delta$n of said liquid crystal layer are set to make a spectral transmittance distribution obtained by synthesizing a spectral transmittance distribution of light transmitted through a liquid crystal element having the product $\Delta$nd1 and a spectral transmittance distribution of light transmitted through a liquid crystal element having the product $\Delta$nd2 substantially flat in a visible range.

40. A device according to claim 39, wherein in a liquid crystal element having a refractive index anisotropy $\Delta$n and a thickness d, the product $\Delta$nd1 of said liquid crystal layer in the area having said coloring films, and the product $\Delta$nd2 of said liquid crystal layer in the area which does not have said coloring films satisfy $$\Delta nd1 < \Delta nd0 < \Delta nd2$$

where d0 is a liquid crystal thickness at which a transmittance exhibits a maximum value as a product $\Delta$nd of said liquid crystal layer is changed.

41. A device according to claim 39, further comprising a flattening film formed on said substrate on which said coloring films are formed, said flattening film serving to flatten an uneven surface formed by said coloring films.

42. A device according to claim 39, wherein said coloring films comprise a plurality of color filters respectively having different transmission wavelength ranges, and thicknesses of said color filters increase in order of a color filter which transmits light in an intermediate wavelength range in a visible range, a color filter which transmits light in a long wavelength range, and a color filter which transmits light in a short wavelength range, and are set to maximize a color gamut defined by color coordinates of said respective color filters.

43. A device according to claim 39, further comprising:
    first and second aligning films respectively formed on the inner surfaces of said pair of substrates, and
    a pair of polarizing plates arranged outside said pair of substrates to sandwich said substrates,
    wherein said first aligning film is formed on a front-side substrate on which light is incident and has undergone an aligning treatment within a range of 0° to 45° in a counterclockwise direction with respect to a horizontal direction when viewed from a front side of said liquid crystal display device, and said second aligning film is formed on a rear-side substrate opposing said front-side substrate and has undergone an aligning treatment in a direction crossing the aligning treatment direction of said first aligning film at 90°.

44. A device according to claim 43, wherein liquid crystal molecules, of said liquid crystal layer, which are located near said rear-side substrate are aligned counterclockwise in a direction within an angle range of 5° to 30° with respect to the horizontal direction when viewed from said front-side substrate.

45. A device according to claim 43, wherein liquid crystal molecules, of said liquid crystal layer, which are located near said rear-side substrate are aligned counterclockwise in a direction within an angle range of about 10° to about 25° with respect to the horizontal direction when viewed from said front-side substrate.

46. A device according to claim 43, wherein thicknesses of said coloring films increase in order of a coloring film which transmits light in an intermediate wavelength range in a visible range, a coloring film which transmits light in a long wavelength range, and a coloring film which transmits light in a short wavelength range, and are set to maximize a color gamut defined by color coordinates of said respective coloring films.

47. A liquid crystal display device comprising:

a pair of substrates opposing each other;

a plurality of first electrodes formed on one of opposing surfaces of said pair of substrates;

at least one second electrode formed on the other of the opposing surfaces to oppose said plurality of first electrodes to thereby form a plurality of pixel areas defined by areas where said at least one second electrode opposes said first electrodes;

color filters having a plurality of colors formed on one of the surfaces of said pair of substrates in correspondence with said pixel areas, at least one of said color filters having an area smaller than an area of a corresponding one of said pixel areas, and an area size of said at least one color filter differing from an area size of other ones of said color filters having other colors;

a liquid crystal layer sandwiched between said pair of substrates; and a reflecting member for reflecting light transmitted through said liquid crystal layer, wherein said pixel areas have a colored light exit area for a colored light beam formed by an area corresponding to said color filters, and a non-colored light exit area for a non-colored light beam formed by an area which does not correspond to said color filters.

* * * * *

UNITED STATES PATENT AND TRADEMARK OFFICE
CERTIFICATE OF CORRECTION

PATENT NO. : 6,124,909
DATED : September 26, 2000
INVENTOR(S) : Takashi Miyashita et al.

It is certified that error appears in the above-identified patent and that said Letters Patent is hereby corrected as shown below:

<u>Title page,</u>
Item [56] References Cited, under "U.S. PATENT DOCUMENTS", insert
-- 5,724,109   3/1998   Nakamura et al.
5,943,107   8/1999   Kadota et al. --

Under "FOREIGN PATENT DOCUMENTS", insert
-- 61-230101   10/1986   Japan --.

Signed and Sealed this

Twentieth Day of November, 2001

*Attest:*

NICHOLAS P. GODICI
*Attesting Officer*   Acting Director of the United States Patent and Trademark Office